US010950839B2

(12) United States Patent
Morisato et al.

(10) Patent No.: US 10,950,839 B2
(45) Date of Patent: Mar. 16, 2021

(54) BATTERY PACK, BUSBAR HOLDER USED FOR BATTERY PACK, AND METHOD FOR MANUFACTURING BATTERY PACK

(71) Applicant: Nissan Motor Co., Ltd., Yokohama (JP)

(72) Inventors: Naoki Morisato, Kanagawa (JP); Yuta Motohashi, Kanagawa (JP)

(73) Assignee: Envision AESC Japan Ltd., Zama (JP)

( * ) Notice: Subject to any disclaimer, the term of this patent is extended or adjusted under 35 U.S.C. 154(b) by 0 days.

(21) Appl. No.: 16/474,146

(22) PCT Filed: Jan. 20, 2017

(86) PCT No.: PCT/JP2017/002014
§ 371 (c)(1),
(2) Date: Jun. 27, 2019

(87) PCT Pub. No.: WO2018/134982
PCT Pub. Date: Jul. 26, 2018

(65) Prior Publication Data
US 2019/0341594 A1    Nov. 7, 2019

(51) Int. Cl.
*H01M 2/20*    (2006.01)
*H01M 2/26*    (2006.01)

(52) U.S. Cl.
CPC ............. *H01M 2/202* (2013.01); *H01M 2/26* (2013.01)

(58) Field of Classification Search
CPC .. H01M 2/202; H01M 2/0217; H01M 2/1077; H01M 2/206; H01M 2/26; Y02E 60/10
See application file for complete search history.

(56) References Cited

U.S. PATENT DOCUMENTS

| 2012/0040223 | A1  | 2/2012  | Odumodu |
| 2015/0037634 | A1* | 2/2015  | Malcolm ............. H01M 10/482 429/90 |
| 2015/0303415 | A1* | 10/2015 | Kayano ................. H01M 2/206 429/159 |

FOREIGN PATENT DOCUMENTS

| CN | 104769746 A  | 7/2015  |
| JP | 2004-63352 A | 2/2004  |
| JP | 2006-127964 A| 5/2006  |
| JP | 2011-521403 A| 7/2011  |
| JP | 2012-515418 A| 7/2012  |
| JP | 2013-161681 A| 8/2013  |
| JP | 2013-229266 A| 11/2013 |

(Continued)

*Primary Examiner* — Miriam Stagg
*Assistant Examiner* — Lilia Nedialkova
(74) *Attorney, Agent, or Firm* — Global IP Counselors, LLP

(57) ABSTRACT

A battery pack includes a plurality of unit cells, a plurality of busbars, a support member and a busbar holder. The unit cells have electrode tabs. The busbars have connection portions joined to the electrode tabs. The support member supports the electrode tabs. The busbar holder retains the busbars. The busbar holder has pressing parts that press the connection portions of the busbars toward the electrode tabs supported by the support member, and deforming parts that urge the pressing parts with a repulsive force in a direction in which the pressing parts are caused to move toward the electrode tabs. The deforming parts have leg parts that extend so as to project in a direction away from the busbars.

11 Claims, 15 Drawing Sheets

(56) References Cited

FOREIGN PATENT DOCUMENTS

| | | |
|---|---|---|
| JP | 2014-110219 A | 6/2014 |
| KR | 10-2015-0060830 A | 6/2015 |

* cited by examiner

BATTERY PACK, BUSBAR HOLDER USED FOR BATTERY PACK, AND METHOD FOR MANUFACTURING BATTERY PACK

CROSS-REFERENCE TO RELATED APPLICATIONS

This application is a U.S. national stage application of International Application No. PCT/JP2017/002014, filed on Jan. 20, 2017.

BACKGROUND

Technical Field

The present invention relates to a battery pack, a busbar holder used in an battery pack, and a method for manufacturing an battery pack.

Background Information

In recent years, the automotive industry has grappled with the development of secondary cells, fuel cells, and other such devices that have a low impact on the environment in order to reduce gas emissions from automobiles. For example, low output is obtained from unit cells composed of a positive electrode, a negative electrode, a separator, etc., in secondary cells, and the unit cells are therefore often used in stacked form. Such products are referred to as "battery packs." In battery packs, individual electrode tabs are brought out from inside of the plurality of unit cells. The plurality of electrode tabs that are brought out are connected to busbars or other such components, and electric power is delivered to the outside.

A plurality of busbars are prepared in accordance with how many unit cells are stacked together. However, sometimes the plurality of busbars are assembled in a state of being held integrally by a separate member, as indicated in Japanese Patent Application Publication No. 2012-515418, from the standpoint of assembly operation efficiency, etc.

SUMMARY

In battery packs, thin-plate-shaped members are molded into prescribed shapes as busbars, and the busbars are joined to electrode tabs in a state in which a prescribed number of the busbars are joined. A plurality of joining locations for the busbars and electrode tabs are provided in battery packs, but variations between independent components, variations in assembly, etc., are present in the busbars and the electrode tabs in the same manner as with other components, and these variations can accumulate. At the plurality of joining locations in the battery pack, the positions of the electrode tabs and the busbars can vary depending on the location, a gap can be produced between the electrode tabs and the busbars, and it can become difficult to perform an operation for bringing the electrode tabs and the busbars into contact so as to enable joining at all of the plurality of joining locations. The inventors investigated improvements in a joining operation with respect to these points.

An object of the present invention is to provide: an battery pack in which it is possible to accommodate gaps that can be produced between electrode tabs and busbars, easily bring each of the electrode tabs and busbars present at a plurality of locations into contact, and join the electrode tabs and busbars; a busbar holder used in an battery pack; and a method for manufacturing an battery pack.

An battery pack according to an aspect of the present invention, which achieves the object described above, has a plurality of unit cells that have electrode tabs, a plurality of busbars that have connection portions joined to the electrode tabs, a support member that support the electrode tabs, and a busbar holder that retains the plurality of busbars. The busbar holder is provided with pressing parts that press the connection portions of the busbars toward the electrode tabs supported by the support member. Another aspect of the present invention includes a busbar holder used in the battery pack described above, the busbar holder being provided with the retaining parts and the pressing parts.

A further aspect of the present invention, which achieves the object described above, is a method for manufacturing an battery pack. In this method, a stack is formed by stacking unit cells that have electrode tabs together with a support member that support the electrode tabs. The busbar holder in which are retained the plurality of busbars having connection portions to be joined to the electrode tabs is then disposed so as to face the electrode tabs supported by the support member. The busbars retained by the busbar holder are then pressed toward the electrode tabs by pressing parts of the busbar holder. The busbars and the electrode tabs are then joined in a state in which the busbars and the electrode tabs are pressed toward each other.

DETAILED DESCRIPTION OF THE EMBODIMENTS

Figure 1:
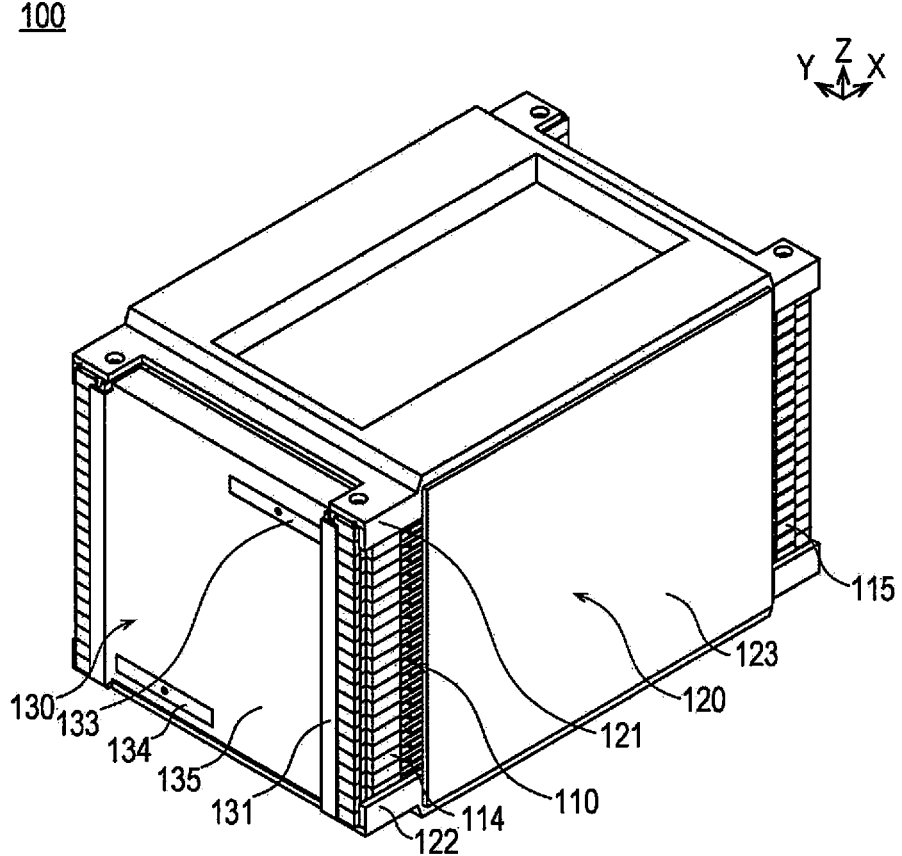
FIG. 1 is a perspective view of an battery pack according to an embodiment of the present invention.

An embodiment according to the present invention is described below with reference to the attached drawings. The same reference numerals are assigned to the same elements illustrated in the drawings, and duplicate descriptions are omitted. The sizes and proportions of members in the drawings are exaggerated for ease of description and can differ from actual sizes and proportions.

An battery pack according to an embodiment of the present invention is described first. In the drawings, arrows indicated by X, Y, and Z are used to show orientations of an battery pack 100. A direction of the arrow indicated by X shows a long-axis direction (direction in which electrode tabs extend) of the battery pack 100. A direction of the arrow indicated by Y shows a short-axis direction (width direction of electrode tabs) of the battery pack 100. A direction of the arrow indicated by Z shows a stacking direction (vertical direction) of the battery pack 100. An XY plane formed by the long-axis direction X and the short-axis direction Y is in the same direction as a plane of flat unit cells.

Figure 2:
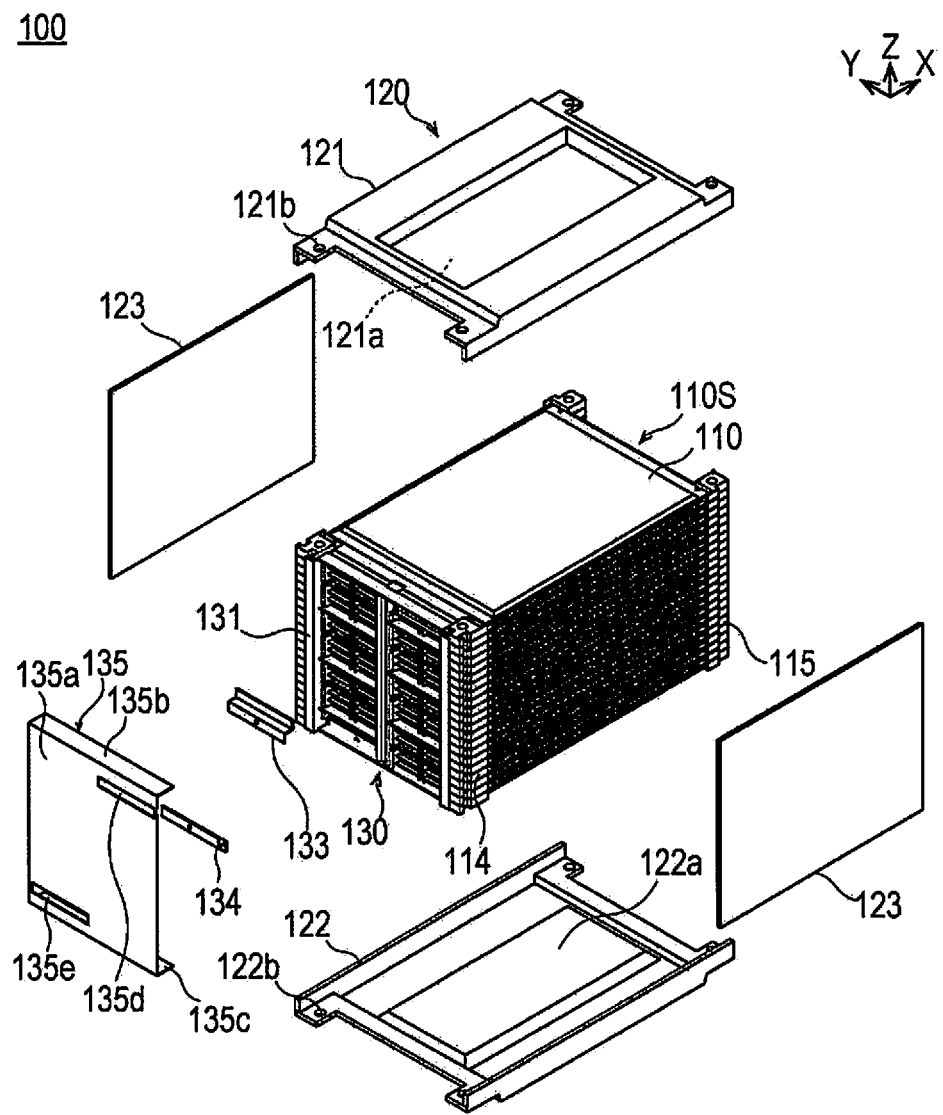
FIG. 2 is a perspective view showing a state in which a pressure-applying unit (upper and lower pressure-applying plates and left and right side plates) is detached from the battery pack shown in FIG. 1, and in which a protective cover and parts (anode-side terminal and cathode-side terminal) of a busbar unit are detached.
Figure 5:
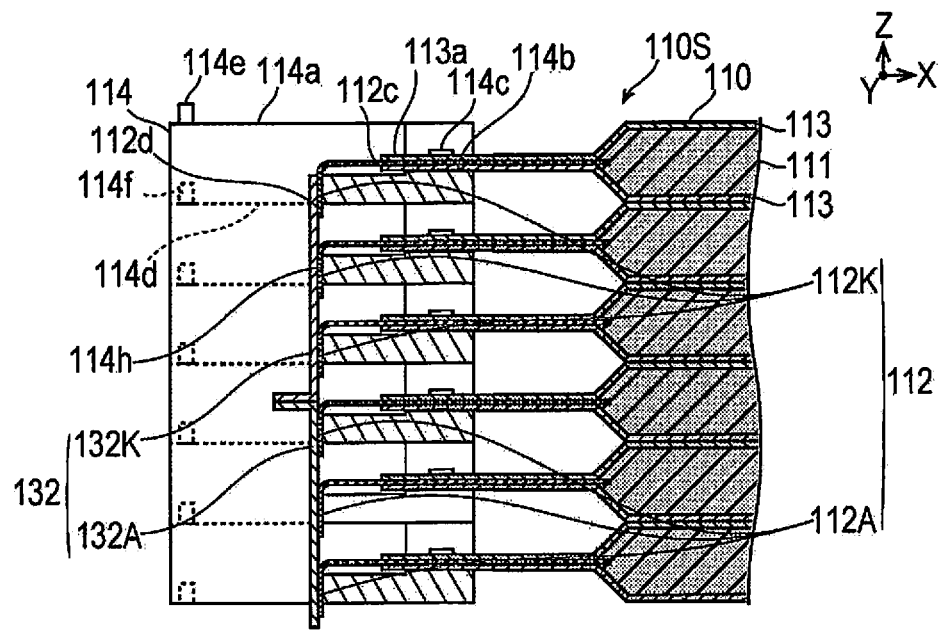
FIG. 5 is a cross-sectional view of the main part in a state in which busbars are joined to electrode tabs of stacked unit cells.
Figure 6:
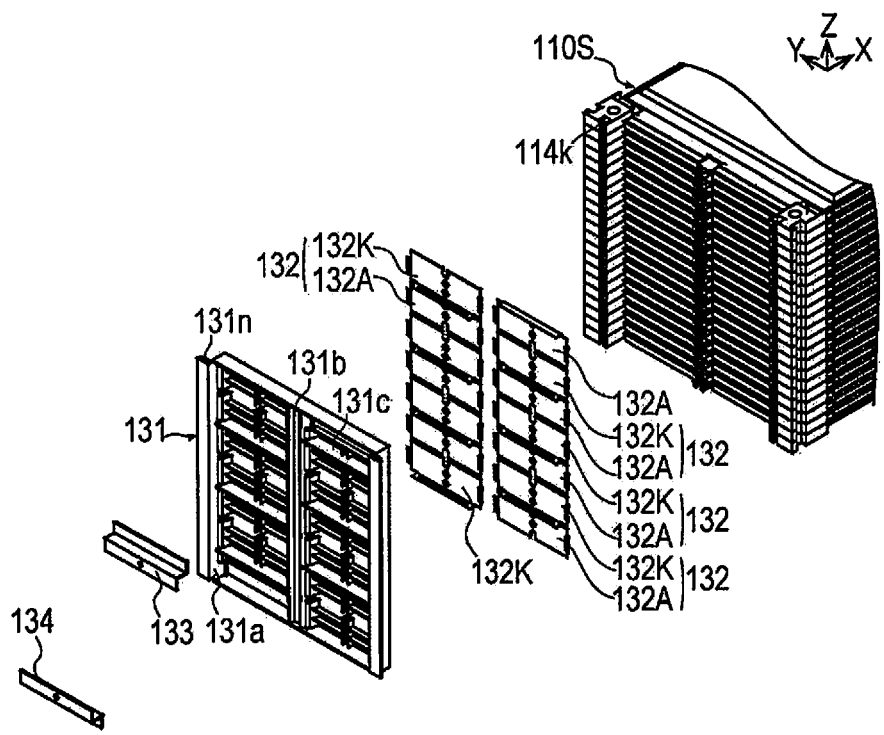
FIG. 6 is an exploded perspective view of a stack, busbars, a busbar holder, and terminals.
Figure 9:
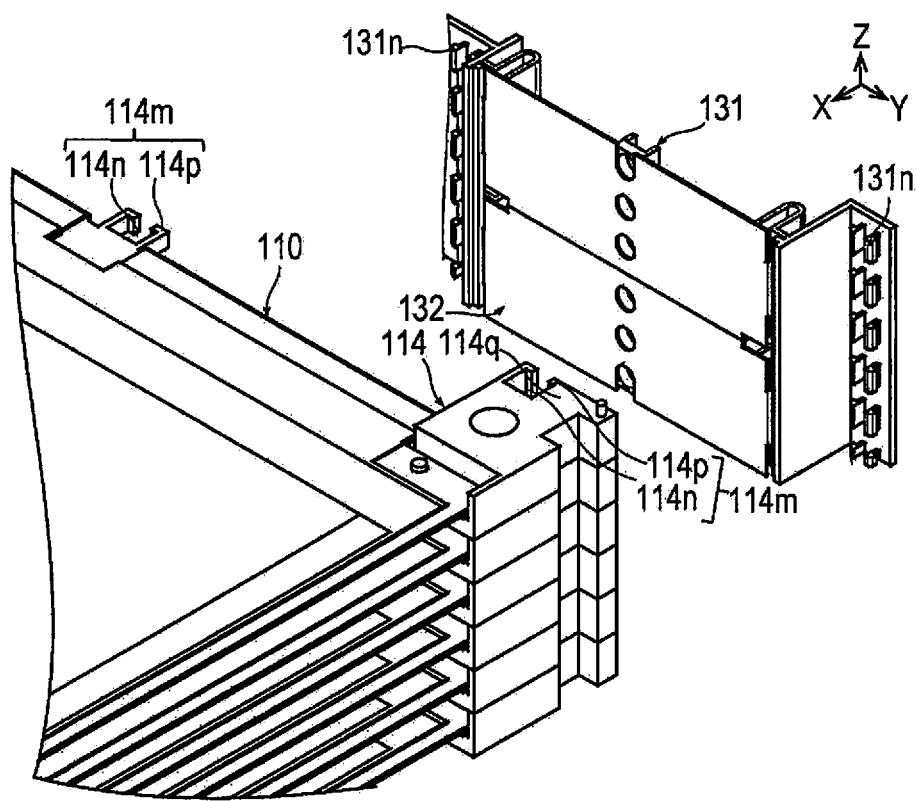
FIG. 9 is a perspective view showing a condition in which the busbar holder in which the busbars are assembled is assembled on spacers that constitute part of the stack.
Figure 10:
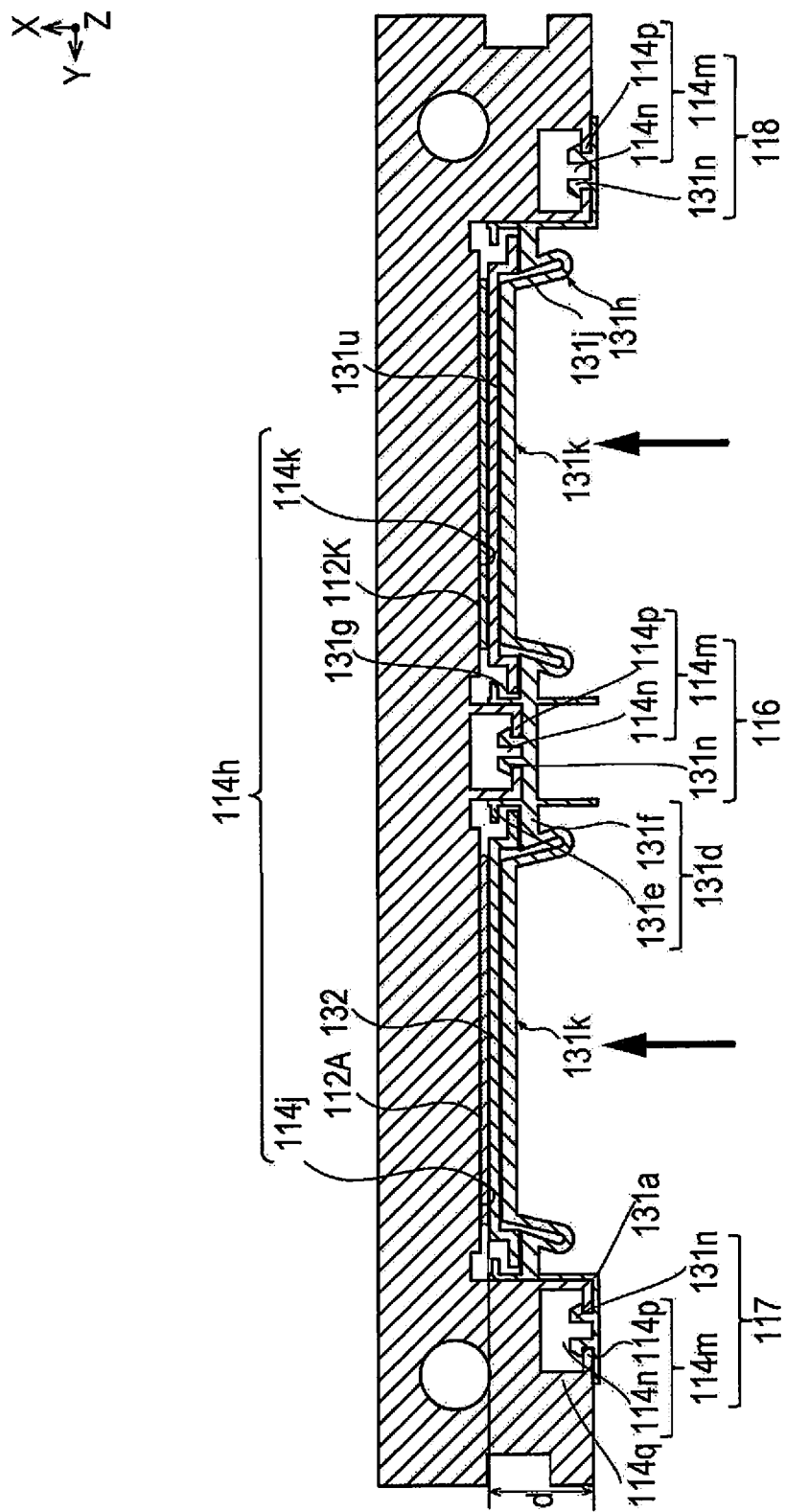
FIG. 10 is a diagram showing a state in which the busbar holder in which the busbars are assembled is assembled on the spacers that constitute part of the stack.

FIG. 1 is a perspective view of an battery pack according to an embodiment of the present invention, FIG. 2 is an exploded perspective view of FIG. 1, and FIG. 5 is a cross-sectional view of a main part in a state in which a busbar is joined to electrode tabs of stacked unit cells. FIG. 6 is an exploded perspective view of a stack, busbars, a busbar holder, and terminals. FIG. 9 is a perspective view showing a condition in which the busbar holder in which the busbars are assembled is assembled on spacers that constitute part of the stack. FIG. 10 is a diagram showing a state in which the busbar holder in which the busbars are assembled is assembled on the spacers that constitute part of the stack.

A plurality of the battery packs 100 are mounted in a vehicle such as an electric automobile, and the battery packs 100 are used as, inter alia, a power supply for driving a vehicular motor. The battery packs 100 are configured so that a stack 110S, which is formed by stacking as plurality of unit cells 110 as shown in FIG. 2, etc., is electrically connected by a busbar unit 130 in a state in which pressure is applied by a pressure-applying unit 120.

The battery pack 100 according to the present embodiment is described in generic terms with reference to FIGS. 9 and 10, and is configured as follows. The battery pack 100 has a plurality of unit cells 110 that have electrode tabs 112, a plurality of busbars 132 that have connection surfaces 132f joined to the electrode tabs 112, first spacers 114 that support the electrode tabs 112, and a busbar holder 131 that retains the busbars 132. In the present description, the first spacers 114 correspond to a support member, and the connection surfaces 132f of the busbars 132 correspond to connection portions with respect to the electrode tabs 112.

The busbar holder 131 has pressing parts 131k that press the connection surfaces 132f of the busbars 132 toward the electrode tabs 112 supported by the first spacers 114. The configurations of the battery pack 100 are described below.

Figure 11:
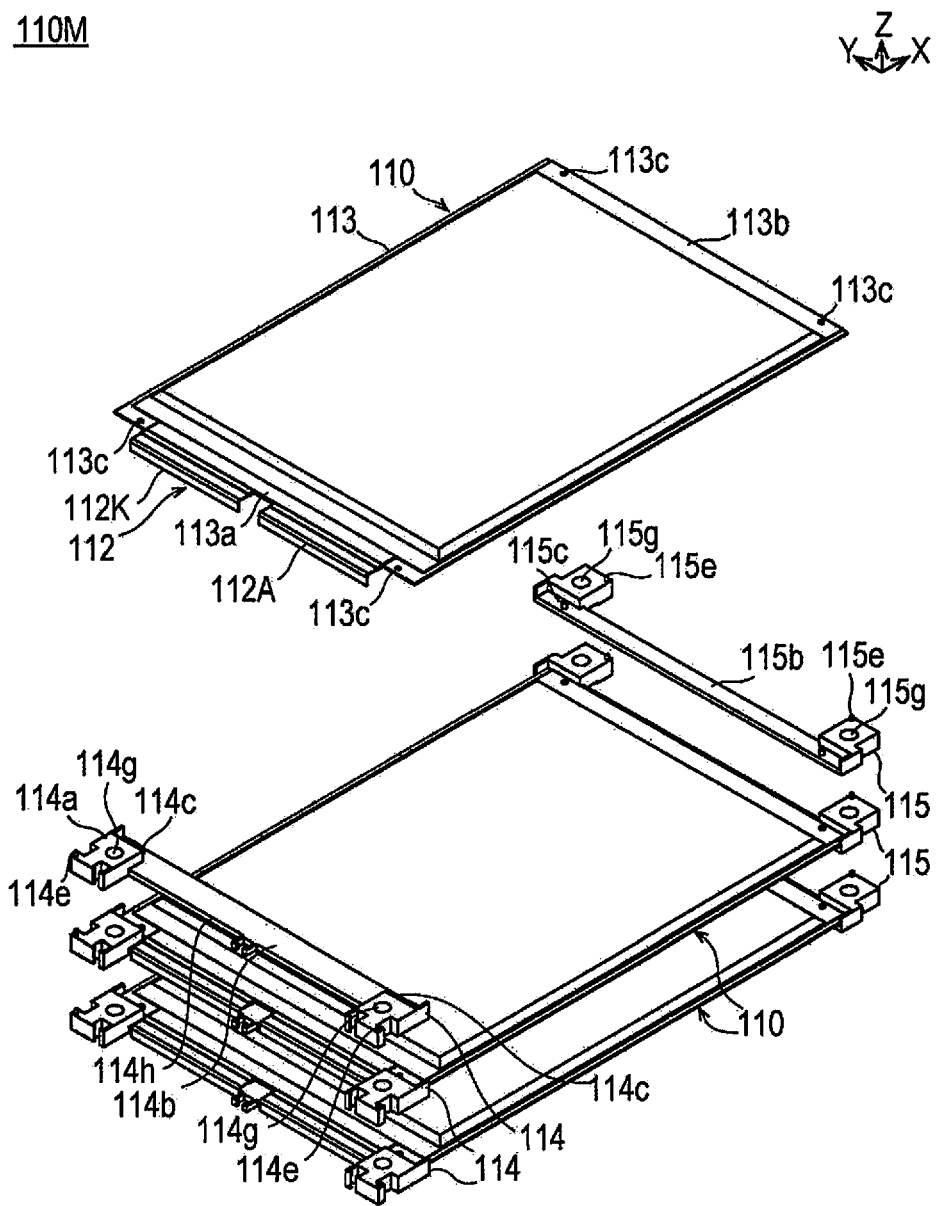
FIG. 11 is a perspective view showing a state in which the stack shown in FIG. 2 is disassembled into individual unit cells, and spacers disposed at two ends are detached from an uppermost unit cell that is one of the unit cells.
Figure 12:
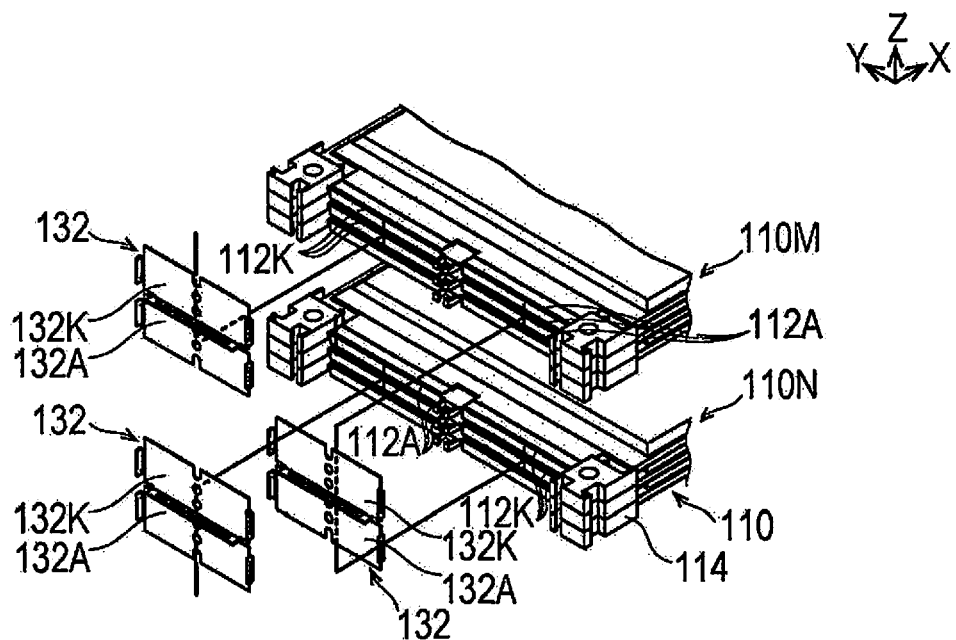
FIG. 12 is a perspective view showing a condition in which cell sub-assemblies that are adjacent in a stacking direction are electrically connected by busbars.

FIG. 11 is a perspective view showing a state in which the stack shown in FIG. 2 is disassembled into individual unit cells, and spacers disposed at two ends are detached from an uppermost unit cell that is one of the unit cells. FIG. 12 is a perspective view showing a condition in which cell sub-assemblies that are adjacent in the stacking direction are electrically connected by the busbars.

The stack 110S is configured so that, as shown in FIGS. 11, 12, etc., a first cell sub-assembly 110M composed of three unit cells 110 electrically connected in parallel and a second cell sub-assembly 110N composed of three unit cells 110 electrically connected in parallel are connected to each other in series in an alternating manner.

The first cell sub-assembly 110M and the second cell sub-assembly 110N are configured in a similar manner. However, the first cell sub-assembly 110M and the second cell sub-assembly 110N are configured so that the three unit cells 110 thereof are vertically inverted, as shown in FIG. 12. Therefore, in the first cell sub-assembly 110M, positions of three anode-side electrode tabs 112A and of three cathode-side electrode tabs 112K are reversed with respect to those in the second cell sub-assembly 110N.

In the first cell sub-assembly 110M, all of the anode-side electrode tabs 112A are positioned on a right side in the drawings, and all of the cathode-side electrode tabs 112K are positioned on a left side in the drawings, as shown in FIG. 12.

In the second cell sub-assembly 110N, all of the anode-side electrode tabs 112A are positioned on the left side in the drawings, and all of the cathode-side electrode tabs 112K are positioned on the right side in the drawings, as shown in FIG. 12. Merely by flipping the vertical arrangement for each of the three unit cells 110, orientations of distal end parts 112d of the electrode tabs 112 can vary vertically along the Z direction. Therefore, individual distal end parts 112d are bent downward so that the orientations of the distal end parts 112d of the electrode tabs 112 of all of the unit cells 110 are all the same.

The unit cells 110 correspond to, e.g., lithium ion secondary cells. A plurality of the unit cells 110 are connected in series to meet the specification for drive voltage of the vehicular motor. A plurality of the unit cells 110 are connected in parallel to ensure cell capacity and extend a travel distance of a vehicle.

The unit cells 110 include power generation elements 111 that perform charging and discharging, electrode tabs 112 that expose the power generation elements 111 to the outside, and lamination films 113 that seal the power generation elements 111, as shown in FIG. 5.

Upon being charged by electric power from an outdoor charging stand, etc., the power generation elements 111 discharge to the vehicular motor, etc., and supply drive power. The power generation elements 111 are configured so that a plurality of sets of anodes and cathodes that are separated by separators are stacked.

The electrode tabs 112 expose the power generation elements 111 to the outside, as shown in FIG. 5. The electrode tabs 112 are configured from anode-side electrode tabs 112A and cathode-side electrode tabs 112K. The anode-side electrode tabs 112A and the cathode-side electrode tabs 112K are brought out from cell bodies of the unit cells 110 in a same direction (long-axis direction X) that intersects a thickness direction of the cell bodies. At least two unit cells 110 are stacked as shown in FIG. 12. The anode-side electrode tabs 112A of one of the unit cells 110 and the cathode-side electrode tabs 112K of the other of the unit cells 110 are arranged in the stacking direction Z. Proximal ends of the anode-side electrode tabs 112A are joined to all anodes included in a single power generation element 111.

The anode-side electrode tabs 112A are formed in the shape of a thin plate and are composed of aluminum (Al) in conformity with the characteristics of an anode. Proximal ends of the cathode-side electrode tabs 112K are joined to all cathodes included in a single power generation element 111. The cathode-side electrode tabs 112K are formed in the shape of a thin plate and are composed of copper (Cu) in conformity with the characteristics of a cathode. A thickness of the cathode-side electrode tabs 112K is equal to or less than a thickness of the anode-side electrode tabs 112A. The thickness of the cathode-side electrode tabs 112K is, e.g., half the thickness of the anode-side electrode tabs 112A.

The electrode tabs 112 are formed to assume the shape of the letter "L" from proximal end parts 112c that are adjacent to the power generation elements 111 to the distal end parts 112d, as shown in FIG. 5. The distal end parts 112d of the electrode tabs 112 are bent downward in the Z direction so as to face an anode-side reverse surface or cathode-side reverse surface of the busbars 132. The distal end parts 112d of the electrode tabs 112 make planar contact with the busbars 132. The distal end parts 112d have spacer-abutting surfaces 112e that abut the first spacers 114, and busbar-abutting surfaces 112f that are in contact with the busbars 132 (see FIG. 18).

The lamination films 113 are formed in pairs and seal the power generation element 111 from above and below in the Z direction, as shown in FIG. 5. The pair of lamination films 113 have a rectangular outer periphery as shown in FIG. 11. The anode-side electrode tabs 112A and the cathode-side electrode tabs 112K are arranged outward from a gap formed by one-end parts 113a that are on one side of the rectangular outer periphery. The lamination films 113 are configured from: metal foils; and insulating sheets, the sheets covering the metal foils from above and below.

The unit cells 110 are stacked as shown in FIG. 5 while in a state of being supported by pairs of spacers (first spacers 114 and second spacers 115) as shown in FIG. 11.

The pairs of spacers (first spacers 114 and second spacers 115) dispose the unit cells 110 at fixed intervals along the stacking direction Z, as shown in FIGS. 5 and 11. The first spacers 114 support the unit cells 110 on sides at which the electrode tabs 112 are brought out. Second spacers 115 support the unit cells 110 on opposite sides from the sides at which the electrode tabs 112 are brought out so that the second spacers 115 face opposite the first spacers 114 in the long-axis direction X of the unit cells 110.

The first spacers 114 are composed of an insulating reinforced plastic and are formed in the shape of a long plate having recesses and protrusions as shown in FIGS. 5 and 11. The first spacers 114 are stacked together with the unit cells 110, and individual first spacers 114 are disposed adjacent to the unit cells 110 in the long-axis direction X. The first spacers 114 are provided so as to face opposite the one-end parts 113a of the pairs of lamination films 113. The first spacers 114 support the one-end parts 113a of the lamination films 113 by means of flat abutting surfaces 114b, as shown in FIG. 5.

The first spacers 114 are provided with support surfaces 114h that are adjacent to the abutting surfaces 114b and that support the electrode tabs 112 on wall surfaces that are aligned in the stacking direction Z. The support surfaces 114h are positioned so that the distal end parts 112d of the electrode tabs 112 are aligned in the X direction, as shown in FIG. 5. When the busbars 132 are to be joined to the electrode tabs 112, the support surfaces 114h support the electrode tabs 112 against pressing from the busbar 132 side due to pressing parts 131k of the busbar holder 131 (described later). The first spacers 114 have anode-side support surfaces 114j that support the anode-side electrode tabs 112A, and cathode-side support surfaces 114k that support the cathode-side electrode tabs 112K, as the support surfaces 114h. The anode-side support surfaces 114j correspond to anode-side support portions in the present description, and the cathode-side support surfaces 114k correspond to cathode-side support portions.

In the first spacers 114, both ends of each of the abutting surfaces 114b that are aligned in the short-axis direction Y are provided with one of a pair of linking pins 114c that protrude upward, as shown in FIG. 11. The pairs of linking pins 114c are formed as circular columns and are inserted into linking holes 113c that open in both ends of the one-end parts 113a of the lamination films 113 that are aligned in the short-axis direction Y, thereby positioning the unit cells 110.

As shown in FIG. 5, upper surfaces 114a of the first spacers 114 and lower surfaces 114d of adjacent first spacers 114 abut each other. Circular-column-shaped positioning pins 114e that protrude from the upper surfaces 114a of the first spacers 114 are fitted into positioning holes 114f that open in the lower surfaces 114d of the adjacent first spacers 114, whereby the first spacers 114 are positioned with each other. The first spacers 114 are provided with locating holes 114g at two ends that are aligned in the short-axis direction Y, as shown in FIG. 11. Bolts that link together a plurality of battery packs 100 while positioning the battery packs 100 along the stacking direction Z are inserted into the locating holes 114g.

FIG. 9 is a perspective view showing a condition in which the busbar holder in which the busbars are assembled is assembled on spacers that constitute part of the stack. The battery pack 100 has linking parts 116-118 that link the busbar holder 131 to the first spacers 114. The linking parts 116 are disposed at first positions between the anode-side support surfaces 114j and the cathode-side support surfaces 114k in the short-axis direction Y. The linking parts 117 are disposed at second positions that are positioned further outward in the short-axis direction Y from the linking parts 116 at the first positions than are the anode-side support surfaces 114*j*. The linking parts 118 are disposed at third positions that are positioned further outward in the short-axis direction Y from the linking parts 116 at the first positions than are the cathode-side support surfaces 114*k*. A state of being elastically deformed is retained in deforming parts 131*h* in a state in which the busbar holder 131 is linked to the first spacers 114 by the linking parts 116-118.

The linking parts 116-118 each have engaging parts 114*m* and engaging parts 131*n*. The engaging parts 114*m* are support-member-side engaging parts formed on the first spacers 114 in the present description. The engaging parts 114*m* are provided to front side surfaces of substantially cuboid end parts 114*q* that are provided to both short-axis-direction Y ends of the first spacers 114, as shown in FIG. 10. The engaging parts 114*m* are provided with: recesses 114*n* formed by notching front end parts of the end parts 114*q*, etc.; and catch parts 114*p* formed on edge parts of the recesses 114*n*, the catch parts 114*p* retaining the position of the busbar holder 131 relative to the first spacers 114. The hook-shaped engaging parts 131*n* provided to the busbar holder 131 are attached to the catch parts 114*p*. The recesses 114*n* are formed so as to notch the sides of the substantially cuboid end parts 114*q*, etc., at which the engaging parts 131*n* are attached. The end parts 114*q* are not limited to being of cuboid shape. A more detailed description is given below.

The second spacers 115 are disposed adjacent to the unit cells 110 in the same manner as the first spacers 114 but do not need to support electrode tabs 112, and therefore are configured as simplifications of the first spacers 114. The second spacers 115 are provided with support surfaces 115*b*, positioning pins 115*e*, linking pins 115*c*, and locating holes 115*g*, as shown in FIG. 11. The support surfaces 115*b* support other-end parts 113*b* of the lamination films 113. The positioning pins 115*e* position the second spacers relative to each other. The linking pins 115*c* position the unit cells 110. Bolts that link together a plurality of battery packs 100 while positioning the battery packs 100 are inserted into the locating holes 115*g*. The second spacers 115 are also provided with configurations corresponding to the upper surfaces 114*a*, lower surfaces 114*d*, and positioning holes 114*f* of the first spacers 114, but these configurations are identical to those of the first spacers 114, and therefore detailed descriptions of these configurations are omitted.

A pressure-applying unit 120 includes: an upper pressure-applying plate 121 and a lower pressure-applying plate 122, said plates applying pressure to the power generation elements 111 of individual unit cells 110 of the stack 110S from above and below; and a pair of side plates 123 that secure the pressure-applying plate 121 and the pressure-applying plate 122 in a state in which pressure is applied to the stack 110S. In the pressure-applying unit 120, a casing that accommodates the stack 110S is configured from the pressure-applying plates 121, 122 and the side plates 123. A more detailed description is given below.

The upper pressure-applying plate 121 applies pressure to the power generation elements 111 of individual unit cells 110 while retaining a plurality of unit cells 110 that constitute the stack 110S by sandwiching the same from above and below together with the lower pressure-applying plate 122, as shown in FIGS. 1 and 2. The pressure-applying plate 121 is formed in the shape of a plate provided with recesses and protrusions and is composed of a metal that is sufficiently rigid. The pressure-applying plate 121 is disposed along a horizontal plane. The pressure-applying plate 121 is provided with a pressure-applying surface 121*a* that applies downward pressure to the power generation elements 111, as shown in FIG. 2. The pressure-applying surface 121*a* is formed flat and protrudes downward from a central portion of the pressure-applying plate 121. The pressure-applying plate 121 is also provided with locating holes 121*b* into which bolts that link together the battery packs 100 are inserted. The locating holes 121*b* are formed as through-holes and open in four corners of the pressure-applying plate 121.

The lower pressure-applying plate 122 is formed in the same shape as the upper pressure-applying plate 121 and is provided so as to be vertically reversed from the pressure-applying plate 121, as shown in FIG. 2. The pressure-applying plate 122 is provided with a pressure-applying surface 122*a* that applies upward pressure to the power generation elements 111, and locating holes 122*b* into which bolts that link together the battery packs 100 while positioning the battery packs 100 along the Z direction are inserted, in the same manner as the pressure-applying plate 121.

The pair of side plates 123 secure the upper pressure-applying plate 121 and the lower pressure-applying plate 122 in a state in which pressure is applied to the stack 110S, as shown in FIGS. 1 and 2. Specifically, the pair of side plates 123 maintain a fixed interval between the pressure-applying plate 121 and the pressure-applying plate 122. The pair of side plates 123 also cover and protect side surfaces that are aligned in the long-axis direction X of the stacked plurality of unit cells 110. The side plates 123 are formed in the shape of a flat plate and are composed of a metal. The pair of side plates 123 are disposed in an upright state so as to face opposite two side surfaces along the long-axis direction X of the stacked plurality of unit cells 110. The pair of side plates 123 are welded to the pressure-applying plate 121 and the pressure-applying plate 122.

Figure 3:
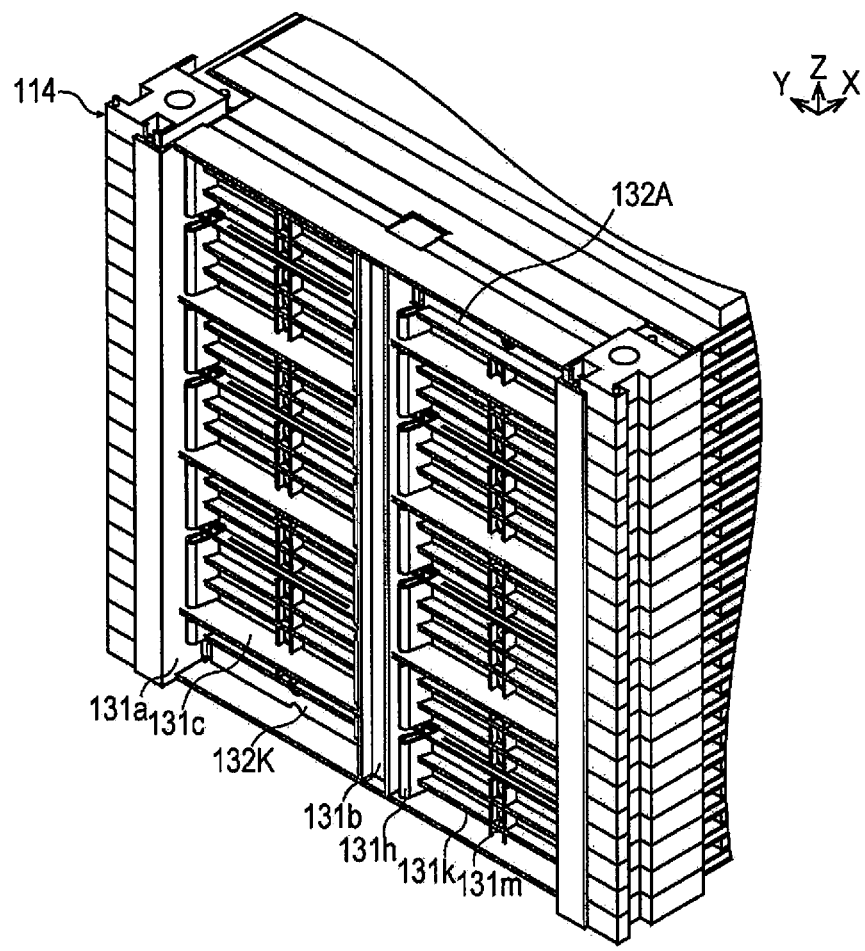
FIG. 3 is a partial expanded view of a front of a plurality of unit cells shown in FIG. 2.
Figure 4:
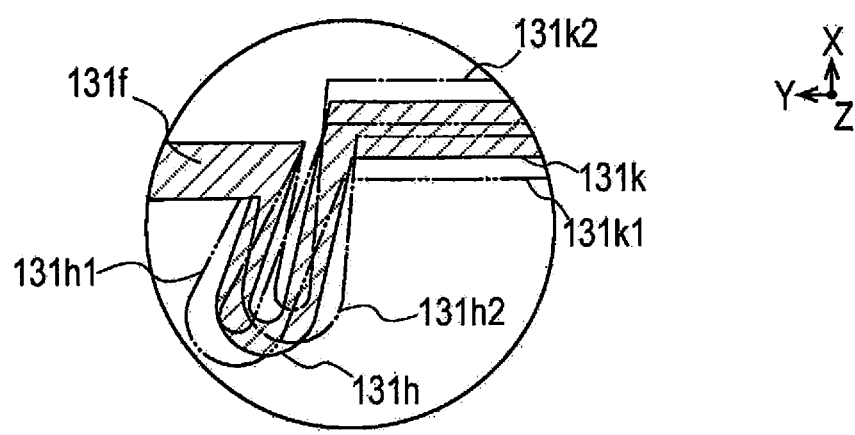
FIG. 4 is a partial expanded view of a main part of the busbar unit.
Figure 7:
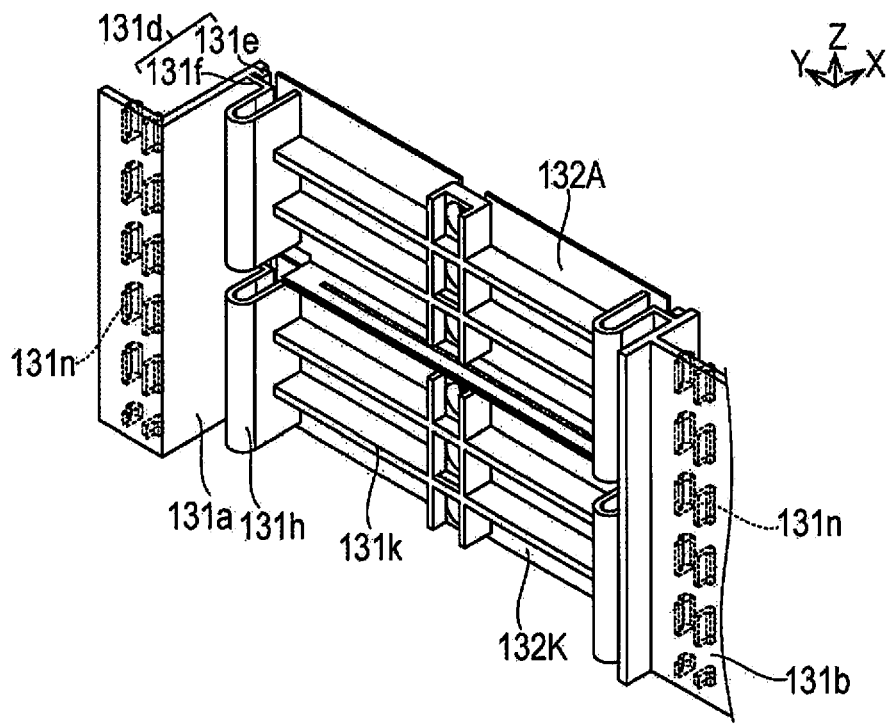
FIG. 7 is a perspective view partially showing a state in which the busbars are attached to the busbar holder.
Figure 8:
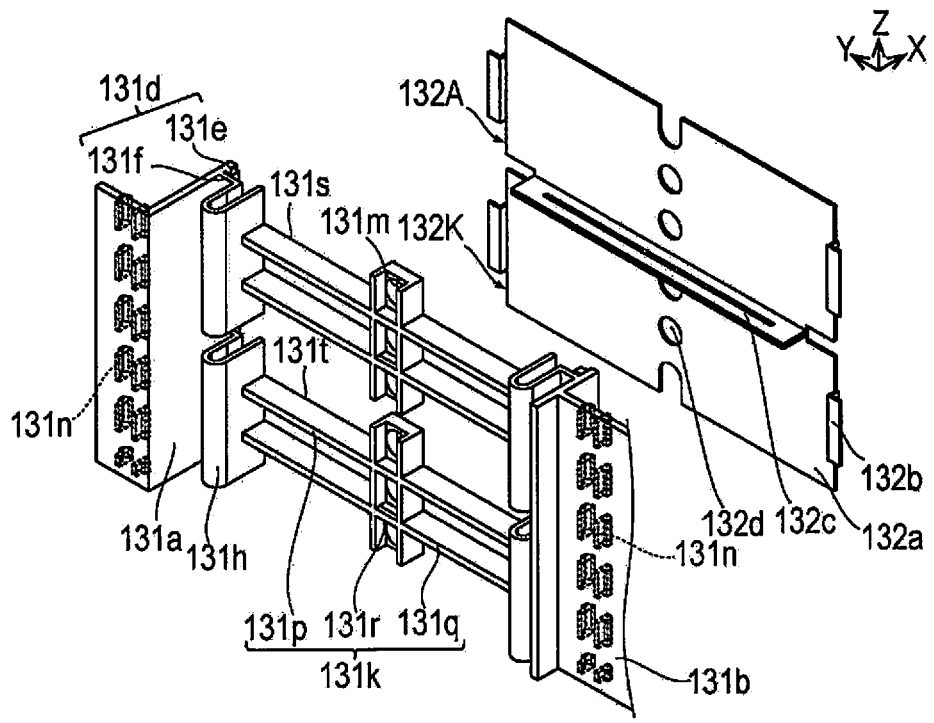
FIG. 8 is a perspective view showing a state in which the busbars and the busbar holder in FIG. 7 are disassembled.

FIG. 3 is a partial expanded view of a front of a plurality of unit cells shown in FIG. 2, and FIG. 4 is an expanded view of a main part of the busbar unit. FIG. 7 is a perspective view showing a state in which the busbars are assembled on the busbar holder, FIG. 8 is an exploded perspective view of FIG. 7, and FIG. 10 is a diagram showing a state in which the busbar holder in which the busbars are assembled is assembled on the spacers that constitute part of the stack.

The busbar unit 130 is described in generic terms with reference to FIG. 6. The busbar unit 130 has a busbar holder 131, busbars 132, an anode-side terminal 133, a cathode-side terminal 134, and a protective cover 135. A more detailed description is given below.

The busbar holder 131 integrally retains a plurality of busbars 132, as shown in FIG. 3. The busbar holder 131 integrally retains the plurality of busbars 132 in the form of a matrix so as to face the electrode tabs 112 of individual unit cells 110 of the stack 110S. The busbar holder 131 is composed of an insulating resin and is formed in the shape of a frame.

The busbar holder 131 has brace parts 131*a*, reinforcing brace parts 131*b*, horizontal wall parts 131*c*, retaining parts 131*d*, the deforming parts 131*h*, the pressing parts 131*k*, openings 131*m*, and the engaging parts 131*n*, as shown in FIGS. 6-10.

The brace parts 131*a* are provided in pairs on both short-axis-direction Y ends of the busbar holder 131 that is formed in the shape of a frame, as shown in FIG. 6. The pairs of brace parts 131*a* fit onto side surfaces of the first spacers 114. The pairs of brace parts 131*a* are formed to assume the shape of the letter "L" as viewed along the stacking direction Z and are formed in the shape of a plate extending along the stacking direction Z.

The auxiliary brace parts 131b are of a shape that extends in the same vertical direction as the brace parts 131a and are positioned near an approximate center or middle of the busbar holder 131, as shown in FIG. 6. The busbars 132 are attached and retained between the brace parts 131a and the auxiliary brace parts 131b.

The horizontal wall parts 131c are of a shape that connects the brace parts 131a and the auxiliary brace parts 131b and extend in a substantially horizontal direction (short-axis direction Y), as shown in FIG. 6. The busbars 132 are disposed in two rows in a horizontal direction (as is described later), and anode-side busbars 132A and cathode-side busbars 132K that are adjacent in the vertical direction (stacking direction Z) are joined to each other. The horizontal wall parts 131c are provided not only at both stacking-direction Z ends of the frame-shaped busbar holder 131 but also between adjacent busbars 132. The horizontal wall parts 131c disposed between adjacent busbars 132 prevent electrical discharge by insulating busbars 132 that are adjacent along the stacking direction Z.

The busbar holder 131 can be configured so that the brace parts 131a, the auxiliary brace parts 131b, and the horizontal wall parts 131c are joined together, said parts being formed independently, or the busbar holder 131 can be configured so that the brace parts 131a, the auxiliary brace parts 131b, and the horizontal wall parts 131c are integrally molded.

The retaining parts 131d are provided to retain the busbars 132 on the busbar holder 131. The retaining parts 131d have hook parts 131e and receiving parts 131f, as shown in FIG. 10. The hook parts 131e are configured in a shape of hooks that protrude inward from the brace parts 131a and the auxiliary brace parts 131b on a side of the busbar holder 131 at which the busbars 132 are inserted (attached).

The receiving parts 131f constitute part of the retaining parts 131d that retain the busbars 132, and attach the pressing parts 131k and deforming parts 131h to the brace parts 131a and auxiliary brace parts 131b. The retaining parts 131d are provided in pairs for each single busbar 132 at both short-axis-direction Y ends of the busbars 132 so as to retain the busbars 132, as shown in FIG. 10.

Groove parts 131g into which the busbars 132 are inserted are formed between the hook parts 131e and the receiving parts 131f. As shown in FIG. 10, the busbars 132 are configured to have a clearance (gap) in the long-axis direction X and so as not to come into contact with both the hook parts 131e and the receiving parts 131f at the same time in the attached state. Similarly, the busbars 132 are configured to have a clearance (gap) in the short-axis direction Y and so as not to come into contact with both the brace parts 131a and the auxiliary brace parts 131b at the same time. The receiving parts 131f are configured in a planar shape extending in the short-axis direction Y in the present embodiment, as shown in FIG. 10, etc. However, the shape of the receiving parts 131f is not particularly limited as long as it is possible to attach the deforming parts 131h and the pressing parts 131k to the brace parts 131a and the auxiliary brace parts 131b.

The deforming parts 131h connect the retaining parts 131d and the pressing parts 131k. The deforming parts 131h are configured to be elastically deformable, and, in an elastically deformed state, urge the pressing parts 131k with a repulsive force in a direction in which the pressing parts 131k are caused to move toward the electrode tabs 112. The deforming parts 131h have U-shaped leg parts 131j that extend between the retaining parts 131d and the pressing parts 131k so as to project in a direction away from to-be-pressed surfaces 132e of the busbars 132. The deforming parts 131h are provided in pairs in the short-axis direction Y across the pressing parts 131k for each single busbar 132, as shown in FIG. 10.

This makes it possible for the pressing parts 131k to press the to-be-pressed surfaces 132e of the busbars 132 toward the electrode tabs 112 and to bond the to-be-pressed surfaces 132e to the electrode tabs 112 at locations inward from retaining portions of the busbars 132. In addition, the deforming parts 131h deform so as to change a position in the long-axis direction X when the electrode tabs 112 and the busbars 132 are attached, or to change a position of the pressing parts 131k in accordance with a variation in shape (see the deforming parts 131h1, 131h2 and the pressing parts 131k1, 131k2 in FIG. 4). This causes the pressing parts 131k (described later) to individually bond all of the busbars 132 in the busbar unit 130 to all of the electrode tabs 112.

The deforming parts 131h are configured to be disposed so as to approach further inward from the busbars 132 than are the retaining parts 131d in a direction (short-axis direction Y in FIG. 10) along contact surfaces of the busbars 132.

The pressing parts 131k press connection surfaces 132f of the busbars 132 toward the electrode tabs 112 supported by the first spacers 114. More specifically, the pressing parts 131k press the plurality of busbars 132 retained by the retaining parts 131d of the busbar holder 131 toward the electrode tabs 112, from the to-be-pressed surfaces 132e on opposite sides from the connection surfaces 132f toward the support surfaces 114h of the first spacers 114. The pressing parts 131k have pressing surfaces 131u that make planar contact with the to-be-pressed surfaces 132e of the busbars 132, as shown in FIG. 10. In the present description, the pressing parts 131k are located at pressing sites of the busbars 132. The pressing parts 131k press the to-be-pressed surfaces 132e of the busbars 132 located inward from the retaining parts 131d toward the electrode tabs 112, as indicated by arrows in FIG. 20. In the busbars 132, locations that can come into contact with the retaining parts 131d function as securing points in a state in which the busbar holder 131 is attached to the stack 110S. However, locations that come into contact with the pressing parts 131k are formed in curved or otherwise non-flat shapes when the pressing parts 131k are not present. The pressing parts 131k suppress the connection surfaces 132f of the busbars 132 from being formed in curved or otherwise non-flat shapes, bring the busbars 132 and the electrode tabs 112 into contact together with the support surfaces 114h of the first spacers 114, and bond the busbars 132 and the electrode tabs 112.

The pressing parts 131k are divided from the retaining parts 131d by the deforming parts 131h and are configured so that all of the busbars 132 included in the battery pack 100 are positioned to be individually bonded to the electrode tabs 112 in a state in which the busbar unit 130 is attached to the stack 110S. More specifically, a distance from spacer-attachment surfaces of the busbar holder 131 to the connection surfaces 132f of the busbars 132 prior to assembly is set to be more than a distance from busbar-holder-attachment end surfaces of the first spacers 114 to the busbar-abutting surfaces 112f of the electrode tabs 112 (see distance d in FIG. 10). Adopting such a configuration makes it possible to bond all of the busbars 132 to the electrode tabs 112 even if there is assembly error or dimensional variation between components of the busbars 132, the electrode tabs 112, etc. In addition, the pressing parts 131k are set to have higher bending strength than the busbars 132 so that the connection surfaces 132f, etc., of the busbars 132 do not separate from the electrode tabs 112. In the present embodiment, sites of the pressing parts 131k, which are configured from a resin material, etc., in contrast to the busbars 132 composed of metal, etc., are configured to be sufficiently thick relative to the plate thickness of the metal busbars 132. The pressing parts 131k constitute contact sites of the busbars 132.

Whereas the busbars 132 are provided with surfaces of a certain size overall as shown in FIG. 8, the pressing parts 131k are configured so that a plurality of cross-sectional surfaces extending vertically and horizontally as shown in FIG. 8 are disposed in a rod-form configuration. More specifically, the pressing parts 131k have two rod-shaped members 131p, 131q that extend horizontally, and a rod-shaped member 131r positioned between the pair of deforming parts 131h, as shown in FIG. 8. The rod-shaped members 131p, 131q are disposed parallel to the vertical direction as shown in FIG. 8, and laser light can be directed between the rod-shaped member 131p and the rod-shaped member 131q, thereby making it possible to avoid interference of the laser light and join the busbars 132 to the electrode tabs 112.

The pressing parts 131k also have anode-side pressing parts 131s that press the anode-side busbars 132A, and cathode-side pressing parts 131t that press the cathode-side busbars 132K, as shown in FIG. 8. The pressing parts 131k are thus configured to impart pressing force in component units and to separately press the anode-side busbars 132A and the cathode-side busbars 132K that constitute the busbars 132. The pressing parts 131k are also are configured so that only one of the rod-shaped members 131p, 131q is provided at a site for attaching the anode-side terminal 133 and cathode-side terminal 134 (described later), as shown in FIG. 3, and so that the terminals 133, 134 can be attached.

The openings 131m are formed as openings provided to the rod-shaped members 131r of the pressing parts 131k as shown in FIG. 8, and can be used to confirm, inter alia, a gap with respect to a component on an inner part (inner side) from the busbars 132 during, e.g., a welding operation. Three openings 131m are provided in the center of the pressing parts 131k in FIG. 8, but the location and number of openings 131m are not limited to this configuration.

The engaging parts 131n constitute part of the linking parts 116-118 and are busbar-holder-side engaging parts formed on the busbar holder 131. The engaging parts 131n enter the recesses 114n of the engaging parts 114m of the first spacers 114 as shown in FIG. 10 and are caught on the catch parts 114p, thereby linking the busbar holder 131 to the first spacers 114. The engaging parts 131n are configured so as to be provided with a pair of shapes protruding outward in directions intersecting the insertion direction, as shown in FIG. 10, and are also configured so that corresponding portions are caught on the catch parts 114p of the spacers 114. In the present embodiment, a single component composed of a resin material, etc., is formed from the brace parts 131a to the engaging parts 131n.

In the busbars 132, the anode-side busbars 132A connected to the anode-side electrode tabs 112A and the cathode-side busbars 132K connected to the cathode-side electrode tabs 112K are joined and integrally formed, as shown in FIGS. 6 and 8. The anode-side busbars 132A and the cathode-side busbars 132K have contact parts 132a, engaging parts 132b, joining parts 132c, and openings 132d. The anode-side busbars 132A and the cathode-side busbars 132K are molded by bending plate-form members to prescribed shapes.

The contact parts 132a have the to-be-pressed surfaces 132e that are pressed by the pressing parts 131k of the busbar holder 131, and the connection surfaces 132f that are provided on the opposite side from the to-be-pressed surfaces 132e and come into contact with the busbar-abutting surfaces 112f of the electrode tabs 112. The pressing parts 131k of the busbar holder 131 come into contact with the to-be-pressed surfaces 132e at a substantially central part of the busbars 132. The connection surfaces 132f are joined to the electrode tabs 112 at busbar-abutting surfaces 112f that are on the opposite side of the electrode tabs 112 from the spacer-abutting surfaces 112e abutting the first spacers 114, at connection portions on the busbars 132 with respect to the electrode tabs 112 (see FIG. 18). The engaging parts 132b are provided to both short-axis-direction Y ends of the plate shape and are provided to retain the busbars 132 by means of the retaining parts 131d of the busbar holder 131. The engaging parts 132b are configured so that end parts of a plate member are bent in the shape of the letter "L," but the shape of the engaging parts 132b is not limited to this shape as long as the busbars 132 can be attached to and retained by the busbar holder 131.

The joining parts 132c are located at one end part of one stacking-direction Z plate member during attachment and are such that the anode-side busbars 132A and the cathode-side busbars 132K are joined at that site to constitute the busbars 132. The joining parts 132c are configured so that the end part of the plate member is bent in FIGS. 7 and 8, but the end part does not have to be bent as long as joining is possible. The openings 132d are configured to allow communication with the openings 131m during assembly onto the busbar holder 131.

The busbars 132 electrically connect the electrode tabs 112 of the unit cells 110 arranged vertically, as shown in FIGS. 5, 6, and 12. The busbars 132 electrically connect the anode-side electrode tabs 112A of one unit cell 110 and the cathode-side electrode tabs 112K of an adjacent unit cell 110. The busbars 132 electrically connect, e.g., the three vertically arranged anode-side electrode tabs 112A of the first cell sub-assembly 110M and the three vertically arranged cathode-side electrode tabs 112K of the second cell sub-assembly 110N, as shown in FIG. 12.

Specifically, the busbars 132, e.g., connect in parallel the three anode-side electrode tabs 112A of the first cell sub-assembly 110M and connect in parallel the three cathode-side electrode tabs 112K of the second cell sub-assembly 110N, as shown in FIG. 12. Furthermore, the busbars 132 serially connect the three anode-side electrode tabs 112A of the first cell sub-assembly 110M and the three cathode-side electrode tabs 112K of the second cell sub-assembly 110N.

The plate thickness of the anode-side busbars 132A is equal to or greater than the plate thickness of the anode-side electrode tabs 112A, and is, e.g., no more than three times the plate thickness of the anode-side electrode tabs 112A. The anode-side busbars 132A are composed of aluminum, similarly to the anode-side electrode tabs 112A.

The cathode-side busbars 132K are composed in the same shape as the anode-side busbars 132A, except in regard to plate thickness. The plate thickness of the cathode-side busbars 132K is equal to or less than the plate thickness of the anode-side busbars 132A. The plate thickness of the cathode-side busbars 132K is equal to or greater than the plate thickness of the cathode-side electrode tabs 112K, and is, e.g., no more than three times the plate thickness of the cathode-side electrode tabs 112K. The cathode-side busbars 132K are composed of copper, similarly to the cathode-side electrode tabs 112K.

Of the busbars 132 set in the form of a matrix, the busbar 132A positioned in the upper right in FIG. 6 correspond to an anode-side endpoint of twenty-one unit cells 110 (three connected in parallel, seven connected in series) and are configured from only the anode-side busbars 132A. The anode-side busbars 132A are welded to the anode-side electrode tabs 112A of the three uppermost unit cells 110 from among the stacked unit cells 110.

Of the busbars 132 set in the form of a matrix, the busbar 132 positioned in the lower left in FIG. 6 correspond to a cathode-side endpoint of twenty-one unit cells 110 (three connected in parallel, seven connected in series) and are configured from only the cathode-side busbars 132K. The cathode-side busbars 132K are welded to the cathode-side electrode tabs 112K of the three lowermost unit cells 110 from among the stacked unit cells 110.

The anode-side terminal 133 exposes the anode-side endpoint of the electrically connected plurality of unit cells 110 to an external input/output terminal, as shown in FIGS. 1 and 2. The anode-side terminal 133 joins to the anode-side busbars 132A positioned in the upper right of the drawing from among the busbars 132 that are set in the form of a matrix, as shown in FIG. 2. The anode-side terminal 133 is formed in the shape of a plate in which both ends are bent and is composed of an electroconductive metal.

The cathode-side terminal 134 exposes the cathode-side endpoint of the electrically connected plurality of unit cells 110 to an external input/output terminal, as shown in FIGS. 1 and 2. The cathode-side terminal 134 joins to the cathode-side busbars 132K positioned in the lower left of the drawing from among the busbars 132 that are set in the form of a matrix, as shown in FIG. 2. The cathode-side terminal 134 is formed in the same shape as the anode-side terminal 133, but is vertically inverted.

The protective cover 135 protects the busbars 132, etc., as shown in FIGS. 1 and 2. Specifically, the protective cover 135 integrally covers the busbar holder 131 that includes the plurality of busbars 132, thereby preventing the individual busbars 132 from coming into contact with other members, etc., and producing an electrical short-circuit. The protective cover 135 is composed of an insulating plastic and is formed such that an upper end 135b and a lower end 135c of a side surface 135a that is upright along the stacking direction Z are bent toward the X direction in the same manner as hooks, as shown in FIG. 2.

The protective cover 135 secures the busbar holder 131 by sandwiching the same from above and below with the upper end 135b and the lower end 135c while covering the individual busbars 132 by means of the side surface 135a. The protective cover 135 is configured so that each of a first opening 135d, which is formed as a rectangular hole and exposes the anode-side terminal 133 to the outside, and a second opening 135e, which is formed as a rectangular hole and exposes the cathode-side terminal 134 to the outside, are provided to the side surface 135a.

Figure 13:
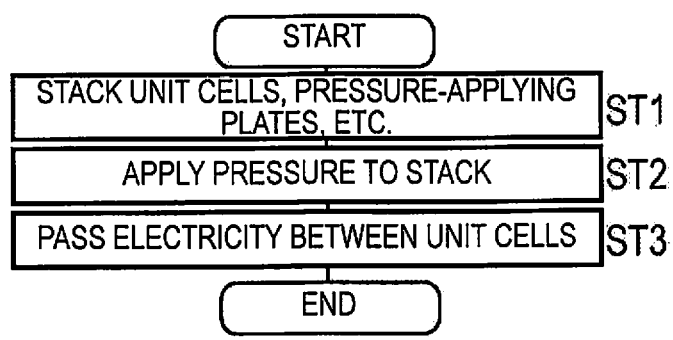
FIG. 13 is a flow chart showing a method for manufacturing an battery pack according to an embodiment of the present invention.

A method for manufacturing an battery pack according to an embodiment of the present invention is described next. FIG. 13 is a flow chart showing a method for manufacturing an battery pack according to an embodiment of the present invention. The method for manufacturing the battery pack 100 according to the present embodiment includes stacking constituent members, applying pressure to the stacked members, and passing electricity between the unit cells 110, as is generally apparent with reference to FIG. 13. In stacking of the constituent members, a stack 110S is formed by stacking unit cells 110 that have electrode tabs 112 together with the second spacers 115 and the first spacers 114 that support the electrode tabs 112. The following operations are performed in passing electricity between the unit cells. The busbar holder 131 in which are retained the plurality of busbars 132 having connection surfaces 132f to be joined to the electrode tabs 112 is disposed so that the electrode tabs 112 supported by the first spacers 114 face each other. The busbars 132 retained by the busbar holder 131 are then pressed toward the electrode tabs 112 by the pressing parts 131k of the busbar holder 131. The busbars 132 and the electrode tabs 112 are then joined in a state in which the busbars 132 and the electrode tabs 112 are pressed toward each other. A more detailed description is given below.

Figure 14:
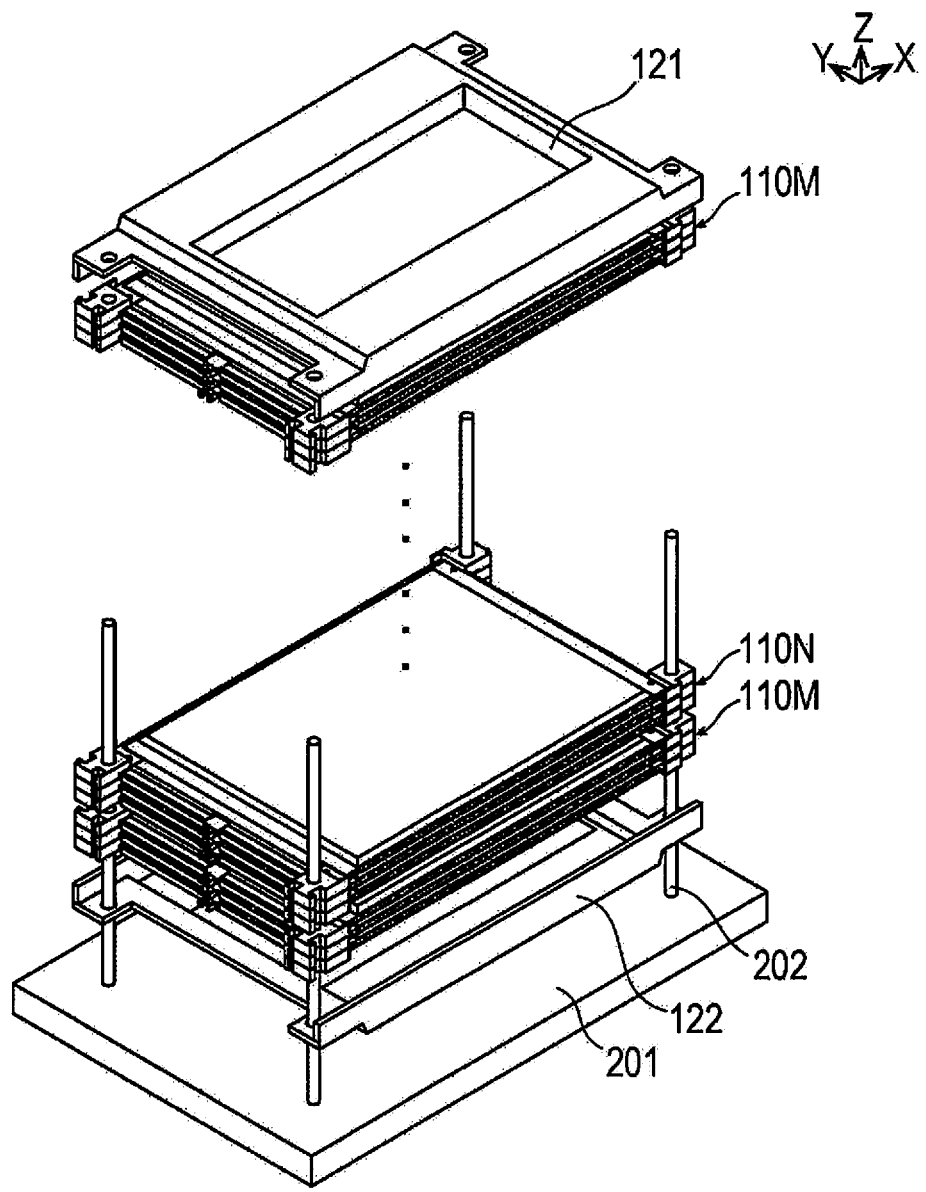
FIG. 14 is a perspective view schematically showing a state in which members that constitute part of the battery pack are sequentially stacked.

FIG. 14 is a perspective view schematically showing a state in which members that constitute part of the battery pack are sequentially stacked. During a stacking step, there is used a placement platform 201 provided with a placement surface that is substantially parallel to the horizontal plane. Locating pins 202 for positioning the stacked pressure-applying plate 122, first cell sub-assembly 110M, second cell sub-assembly 110N, and pressure-applying plate 121 in relation to the long-axis direction X and the short-axis direction Y are installed at prescribed intervals in the placement platform 201. The intervals between the locating pins 202 correspond to, inter alia, intervals between the locating holes 121b in the pressure-applying plate 121. During stacking, the members constituting the battery pack 100 are stacked using, inter alia, a robot arm, a hand lifter, and a vacuum-suction-type collet.

During stacking the locating holes 122b in the pressure-applying plate 122 are inserted onto the locating pins 202 using a robot arm or the like, and the pressure-applying plate 122 is lowered along the stacking direction Z to place on the placement surface of the placement platform 201, as shown in FIG. 14. Next, the locating holes 114g, 115g in the second cell sub-assembly 110N and the first cell sub-assembly 110M are then inserted onto the locating pins 202, and the cell sub-assemblies 110M, 110N are lowered along the stacking direction Z to stack on the pressure-applying plate 122. More specifically, the stack 110S is formed by stacking the unit cells 110 having the electrode tabs 112 together with the second spacers 115 and the first spacers 114 that have the support surfaces 114h with which the electrode tabs 112 come into contact. When a prescribed number of first cell sub-assemblies 110M and second cell sub-assemblies 110N have been stacked, the locating holes 121b in the pressure-applying plate 121 are inserted onto the locating pins 202, and the pressure-applying plate 121 is stacked. This results in a state in which the stack 110S is disposed between the pressure-applying plates 121, 122 (ST1).

Figure 15:
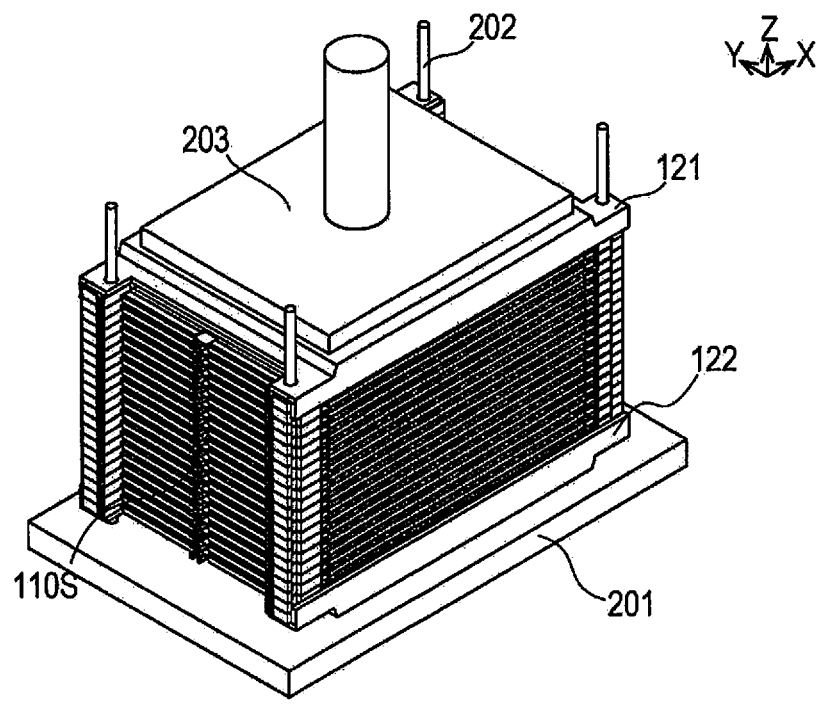
FIG. 15 is a perspective view schematically showing a state in which constituent members of the battery pack are pressed from above.
Figure 16:
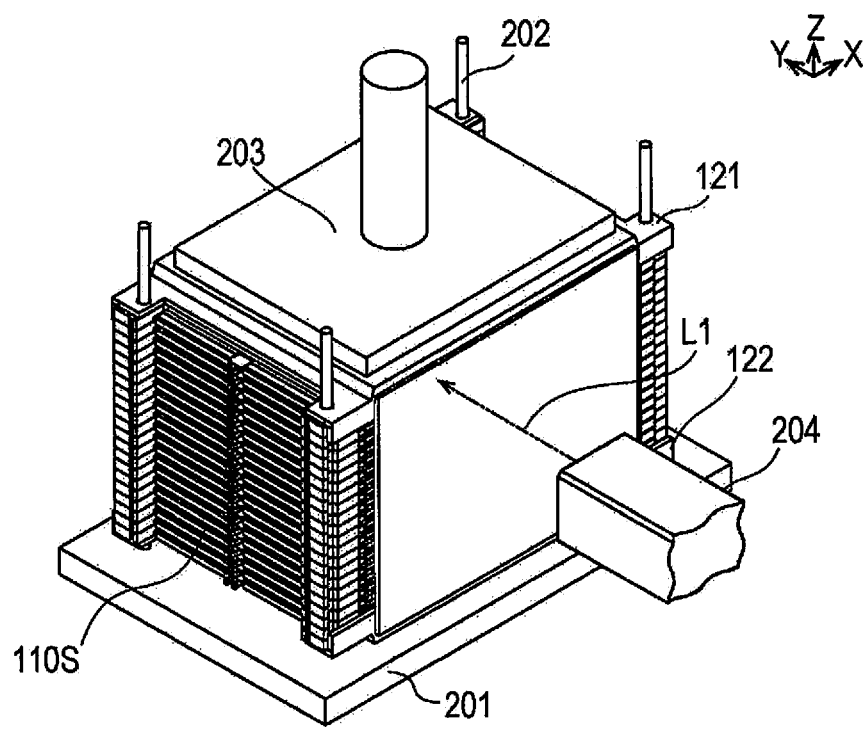
FIG. 16 is a perspective view schematically showing a state in which the side plates and the pressure-applying plates are welded.

FIG. 15 is a perspective view schematically showing a state in which constituent members of the battery pack are pressed from above, and FIG. 16 is a perspective view schematically showing a state in which the side plates and the pressure-applying plates are welded. A pressure-applying jig 203 in which pressure-applying parts are supported by support parts is used during application of pressure. The support parts are linked to a hydraulic cylinder and/or an electromotive stage for driving along the stacking direction Z. The pressure-applying parts move vertically along the stacking direction Z via the support parts and impart pressure to the pressure-applying plate 121.

In this step, the pressure-applying jig 203 is lowered and caused to abut the pressure-applying plate 121. Pressure is then imparted through the pressure-applying plate 121 along the stacking direction Z to the stack 110S that is disposed between the pressure-applying plates 121, 122 (ST2).

A laser oscillator 204 is used during joining (referred to as first joining below) of the side plates 123 and the pressure-applying plates 121, 122.

The laser oscillator 204 is a light source for joining the side plates 123 to the pressure-applying plates 121, 122. The laser oscillator 204 is configured from, e.g., an yttriumaluminum-garnet (YAG) laser. An optical path of laser light L1 emitted from the laser oscillator 204 is produced by, e.g., an optical fiber or a mirror, and upper ends or lower ends of the side plates 123 are irradiated with the laser light L1 in a state in which the laser light L1 is collected by a collecting lens. The laser light L1 can be configured to be branched by, e.g., a half-mirror and directed on both the upper ends and the lower ends of the side plates 123 at the same time.

During the first joining, as shown in FIG. 16, a plurality of locations on the upper ends and the lower ends of the side plates 123 are irradiated with the laser light L1 from the laser oscillator 204, and joining is performed by seam welding (ST3). This maintains a state in which the stack 110S is pressed in the stacking direction Z by the pressure-applying plates 121, 122. The pressure-applying jig 203 stops applying pressure to the pressure-applying plate 121 at this point in time and is separated from the pressure-applying plate 121.

Figure 17:
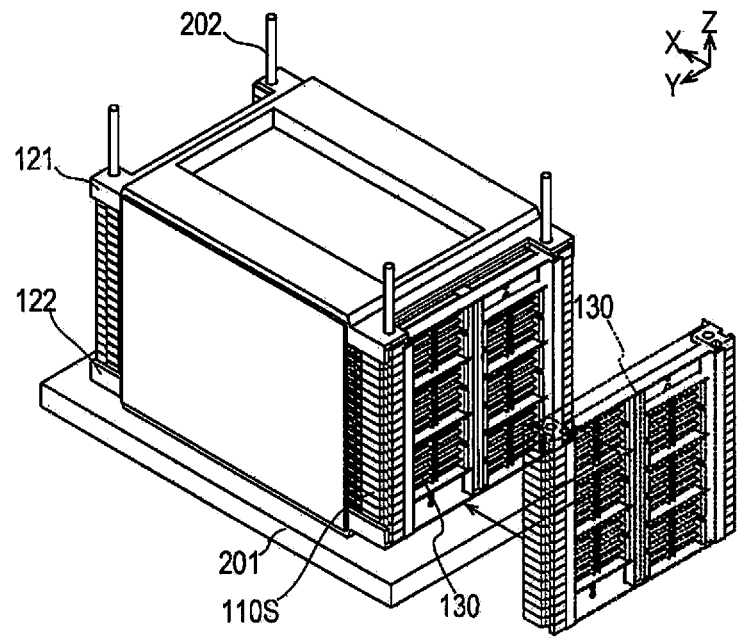
FIG. 17 is a perspective view schematically showing a situation where the busbar unit is attached to a stack with which pressure-applying units are assembled.
Figure 18:
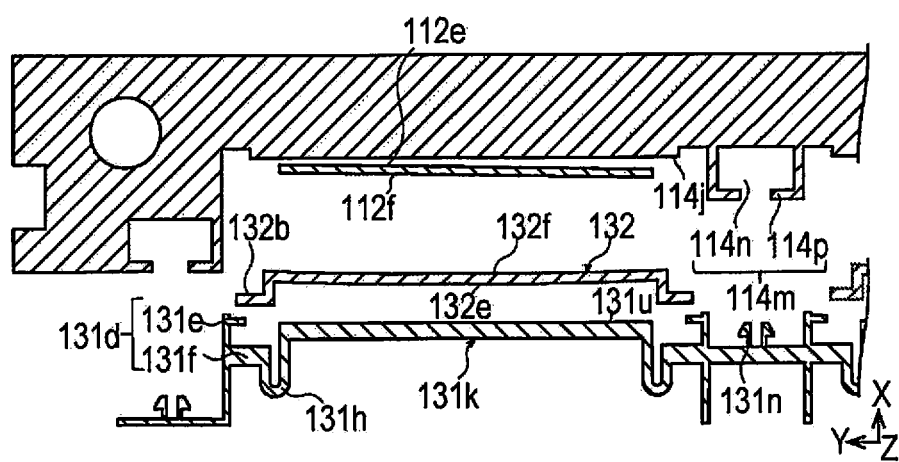
FIG. 18 is a diagram illustrating a state before the busbar holder to which the busbars are attached is attached to a stack that includes spacers, before the busbars are attached to the busbar holder.
Figure 19:
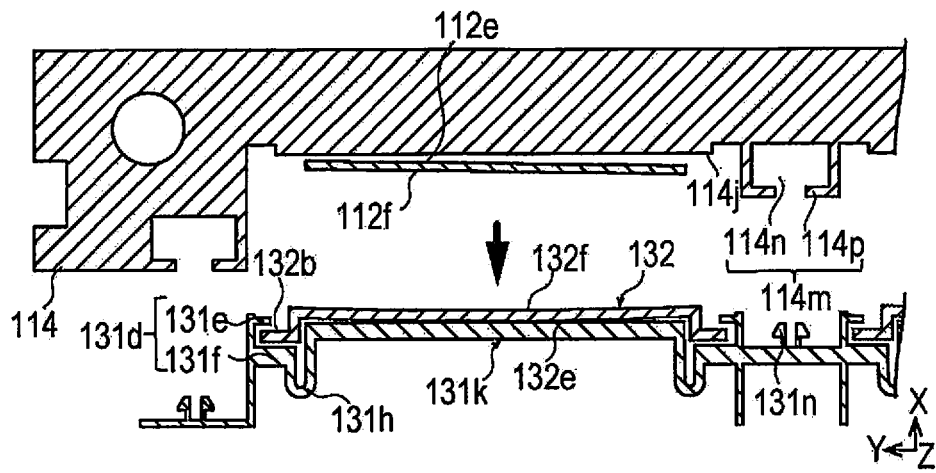
FIG. 19 is a diagram illustrating a condition in which the busbar holder to which the busbars are attached is attached to the stack that includes the spacers following FIG. 18.
Figure 20:
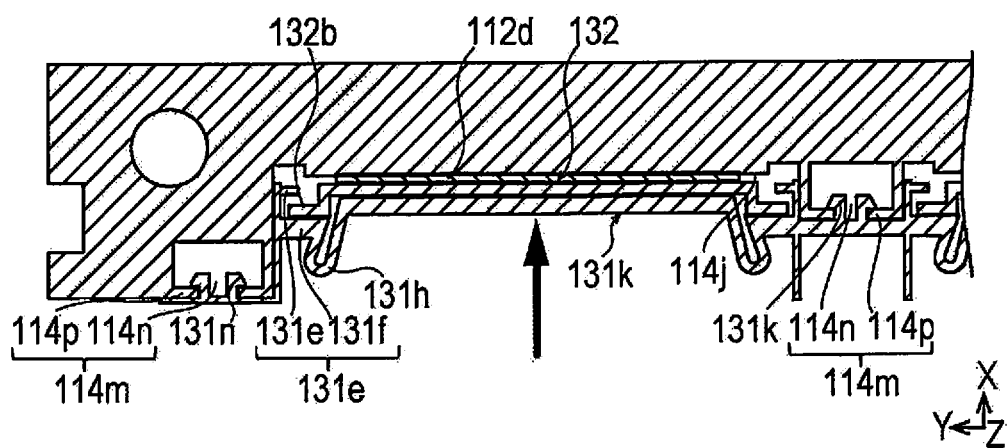
FIG. 20 is a diagram illustrating a state in which the busbars and the busbar holder are attached to the stack that includes the spacers following FIG. 19.
Figure 21:
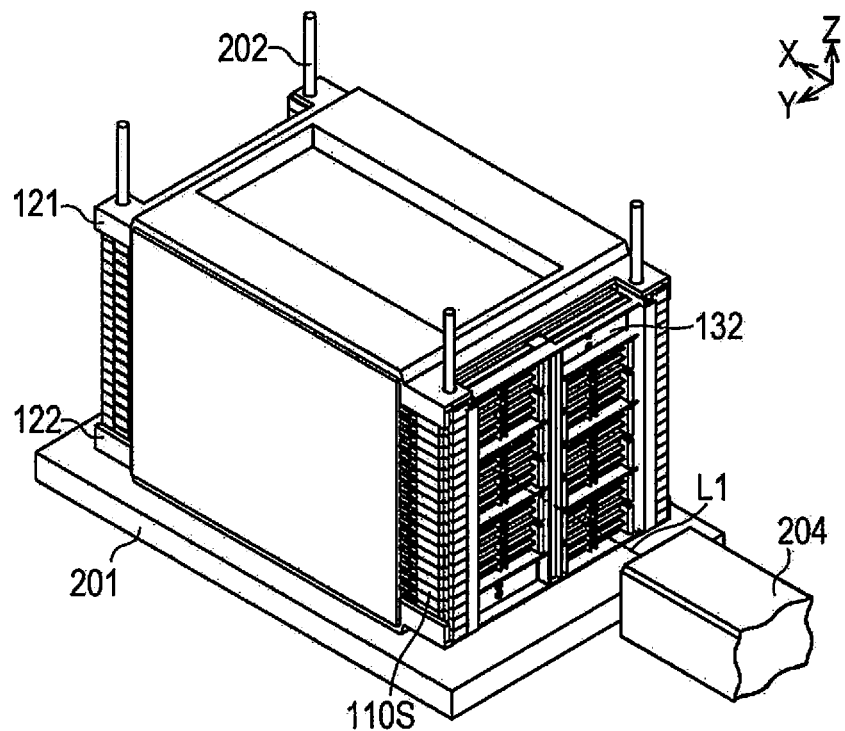
FIG. 21 is a perspective view schematically showing a situation where the busbars constituting part of the busbar unit are welded to the electrode tabs.
Figure 22:
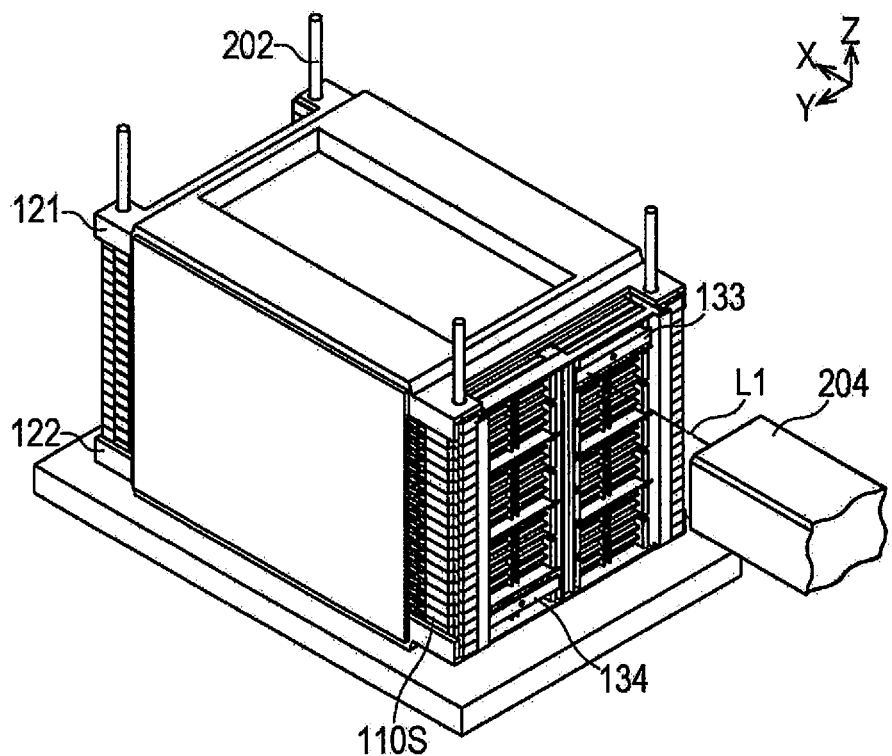
FIG. 22 is a perspective view schematically showing a situation where an anode-side terminal is welded to an anode-side busbar, and a cathode-side terminal is welded to a cathode-side busbar.

FIG. 17 is a perspective view schematically showing a state in which the busbar unit is attached to a stack, and FIGS. 18-20 are diagrams illustrating a situation where the busbars are attached to the busbar holder and the busbar holder to which the busbars are attached is attached to the stack that includes spacers. FIG. 21 is a perspective view schematically showing a state in which the busbars constituting part of the busbar unit are welded to the electrode tabs. FIG. 22 is a perspective view schematically showing a situation where an anode-side terminal is welded to an anode-side busbar, and a cathode-side terminal is welded to a cathode-side busbar.

During passing of electricity between the unit cells, a plurality of busbars 132 are attached to the busbar holder 131, and the busbar holder 131 to which the busbars 132 are attached is attached to the stack 110S that includes the first spacers 114. Joining (referred to as second joining below) of the busbars 132 and the electrode tabs 112, and joining of the terminals 133, 134 and the busbars 132, are then performed. The protective cover 135 is attached to the stack 110S so as to cover the busbar unit 130. A more detailed description is given below.

During the second joining, the busbars 132 and the busbar holder 131 are prepared as shown in FIG. 18, the placement platform 201 is rotated, and the site where the busbar unit 130 is disposed is caused to face the laser oscillator 204.

The pressing parts 131k and the deforming parts 131h are caused to deform (flex) somewhat starting from the pressing parts 131k of the busbar holder 131, and an interval between pairs of retaining parts 131d is increased to insert the engaging parts 132b of the busbars 132 into the groove parts 131g. When the engaging parts 132b have been inserted into the groove parts 131g in the long-axis direction of the busbars 132, the deformation of the deforming parts 131h and the pressing parts 131k is released. This results in a state in which the busbars 132 are temporarily held by the busbar holder 131, as shown in FIG. 19.

The engaging parts 131n of the busbar holder 131, which constitute part of the linking parts 116-118, are then elastically deformed and fitted into the catch parts 114p of the engaging parts 114m of the first spacers 114. The busbar holder 131 that includes the busbars 132 is thus linked to the stack 110S that includes the first spacers 114 by means of the linking parts 116-118. The state in which the deforming parts 131h is elastically deformed is thereby retained.

At this point in time, all of the busbars 132 in the busbar unit 130 come into contact with the pressing surfaces 131u of the pressing parts 131k, said contact occurring at the to-be-pressed surfaces 132e on the opposite side from the connection surfaces 132f for joining with the electrode tabs 112. In this contact, deforming the elastically deformable deforming parts 131h by which the retaining parts 131d and the pressing parts 131k are connected causes the deforming parts 131h to urge the pressing parts 131k with a repulsive force in a direction in which the pressing parts 131k are caused to move toward the electrode tabs 112.

This results in a state in which all of the electrode tabs 112 of the stack 110S are individually bonded to all of the busbars 132 of the busbar unit 130 due to the deformation of the deforming parts 131h and the pressing of the pressing parts 131k, as shown in FIG. 20. By causing the catch parts 114p of the engaging parts 114m to engage with the engaging parts 131n, the position of the busbar holder 131 that includes the busbars 132 relative to the stack 110S that includes the electrode tabs 112 is retained.

The busbars 132 are then joined to the electrode tabs 112. Specifically, as shown in FIG. 21, the laser light L1 is directed from the laser oscillator 204 toward the busbars 132, and the busbars 132 and the distal end parts 112d of the anode-side electrode tabs 112A or cathode-side electrode tabs 112K are joined by spot welding or seam welding (ST4). The anode-side terminal 133 is then joined to the anode-side busbars 132A positioned at the anode-side endpoint, as shown in FIG. 22. Similarly, the cathode-side terminal 134 is joined to the cathode-side busbars 132K positioned at the cathode-side endpoint.

Figure 23:
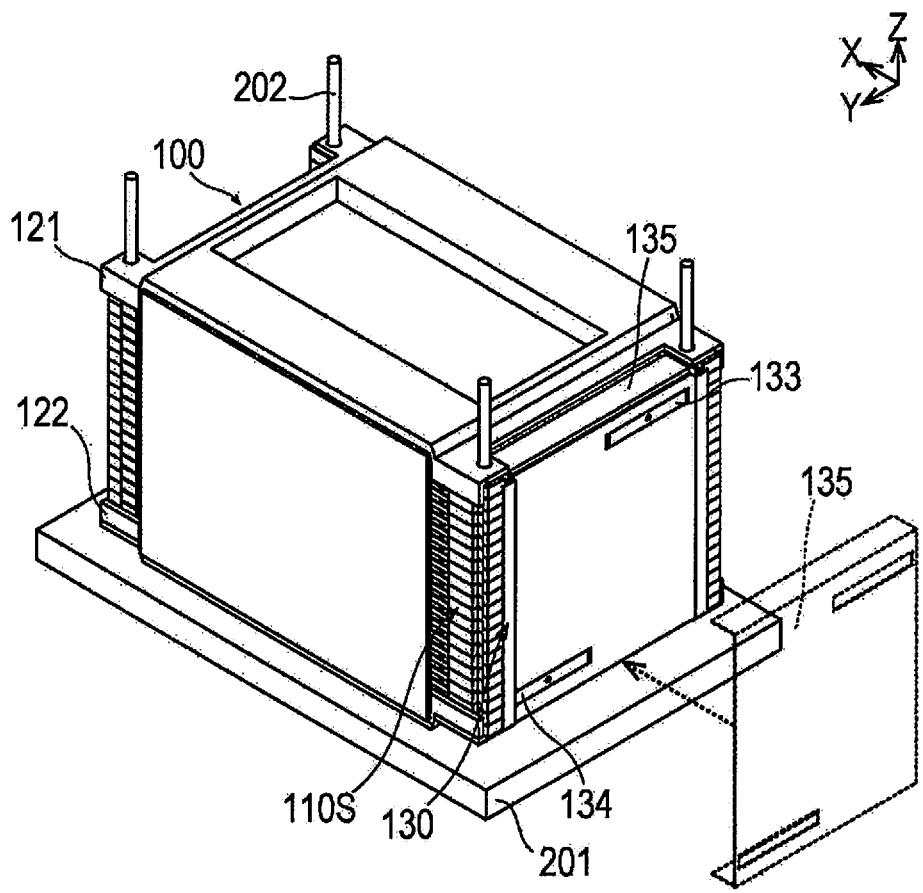
FIG. 23 is a perspective view schematically showing a situation where a protective cover is attached to the stack to which the pressure-applying unit and the busbar unit are attached.

FIG. 23 is a perspective view schematically showing a state in which the protective cover is attached to the stack. In this step, the robot arm is used to attach the protective cover 135 to the busbar holder 131 while fitting the upper end 135b and the lower end 135c of the protective cover 135 onto the busbar holder 131. The upper end 135b and the lower end 135c of the protective cover 135 can be joined to the busbar holder 131 by an adhesive agent. The completely manufactured battery pack 100 is extracted from the locating pins 202, removed from the placement platform 201, and sent to, inter alia, an inspection step for inspecting battery performance, etc.

The manufacturing method described above can be performed by any of an automated apparatus in which all of the steps are controlled by a controller, a semi-automated apparatus in which some of the steps are handled by an operator, or a manual apparatus in which all of the steps are handled by an operator.

The battery pack 100 in the present embodiment has the plurality of unit cells 110 that have the electrode tabs 112, the plurality of busbars 132 that have the connection surfaces 132f joined to the electrode tabs 112, the first spacers 114 that support the electrode tabs 112, and the busbar holder 131 that retains the busbars 132. The busbar holder 131 has the pressing parts 131k that press the connection surfaces 132f of the busbars 132 toward the electrode tabs 112 supported by the first spacers 114.

The method for manufacturing the battery pack 100 includes the following operations. First the stack 110S is formed by stacking the unit cells 110 having the electrode tabs 112 together with the first spacers 114 that support the electrode tabs 112. The busbar holder 131 in which are retained the plurality of busbars 132 having the connection surfaces 132f to be joined to the electrode tabs 112 is then disposed so as to face the electrode tabs 112 supported by the first spacers 114. The busbars 132 retained by the busbar holder 131 are then pressed toward the electrode tabs 112 by the pressing parts 131k of the busbar holder 131. The busbars 132 and the electrode tabs 112 are then joined in a state in which the busbars 132 and the electrode tabs 112 are pressed toward each other.

Therefore, gaps that could be produced due to error in, inter alia, the shape or assembling of the busbars 132 and the electrode tabs 112 in a case where the pressing parts 131k are not present are accommodated, and the pressing parts 131k make it possible to easily bring all of the electrode tabs 112 and the busbars 132 included in the busbar holder 131 into individual contact. In addition, due to the busbar holder 131 having the pressing parts 131k, it is unnecessary to press the electrode tabs 112 and the busbars 132 one at a time using a jig, etc., for pressing the busbars 132 and to correct gaps between the busbars 132 and the electrode tabs 112. Accordingly, it is possible to achieve a joining operation in a state in which gaps that could be produced between the electrode tabs 112 and the busbars 132 are accommodated, and in which the electrode tabs 112 and the busbars 132 that are present at a plurality of locations are easily brought into individual contact. It is also possible to simplify equipment or to simplify the joining operation.

The busbar holder 131 also has the elastically deformable deforming parts 131h. In an elastically deformed state, the deforming parts 131h urge the pressing parts 131k with a repulsive force in a direction in which the pressing parts 131k are caused to move toward the electrode tabs 112. In the method for manufacturing the battery pack 100, when the busbars 132 and the electrode tabs 112 are to be joined, the deformation of the elastically deformable deforming parts 131h of the busbar holder 131 urges the pressing parts 131k with a repulsive force in a direction in which the pressing parts 131k are caused to move toward the electrode tabs 112.

The repulsive force produced by the elastic deformation of the deforming parts 131h in this manner is used to make it possible to maintain a state in which the busbars 132 are in contact with the electrode tabs 112.

The deforming parts 131h are configured to have the U-shaped leg parts 131j that extend so as to project in a direction away from the busbars 132. The unit cells 110, etc., that produce electric power are present on the joining-surface side of the busbars 132, and therefore from the standpoint of space, it is inefficient to provide the U shape on the joining-surface side of the busbars 132. In addition, when a projecting shape is provided on the joining-surface side of the busbars 132, the pressing parts 131k readily deform in an arcuate shape toward the protective cover 135 opposing the busbars 132, and the busbars 132 sometimes are difficult to press toward the electrode tabs 112 in such cases. Therefore, the deforming parts 131h have the leg parts 131j that extend so as to project in a direction away from the busbars 132, thereby making it possible to press the electrode tabs 112 in a manner that is efficient from the standpoint of space and pressing force.

The U shape of the deforming parts 131h is disposed so as to approach further inward (substantially toward a center) from the busbars 132 than are the retaining parts 131d in the short-axis direction Y (direction along the contact surfaces of the busbars 132) in FIG. 10. An opening shape, etc., for visually confirming gaps between the busbars and the electrode tabs is sometimes provided to the busbar holder 131. Even in such cases, adopting the configuration described above makes it possible to dispose the deforming parts 131h in the busbar holder 131 in a compact manner without disrupting the function of the opening shape.

The pressing parts 131k have pressing surfaces 131u that make planar contact with the busbars 132. Therefore, it is possible to accommodate gaps between the busbars 132 and the electrode tabs 112 and to sufficiently cause these components to come into contact or bond together. In addition, due to the pressing parts 131k making planar contact with the to-be-pressed surfaces 132e of the busbars 132, it is possible to prevent damage near local sections of the busbars 132 and to increase the deflection margin of the busbars 132.

At least two of the unit cells 110 are stacked, and the anode-side electrode tabs 112A of one of the unit cells 110 and the cathode-side electrode tabs 112K of the other unit cell 110 are arranged in the stacking direction Z of the unit cells 110. The busbars 132 are integrally formed by joining the anode-side busbars 132A connected to the anode-side electrode tabs 112A and the cathode-side busbars 132K connected to the cathode-side electrode tabs 112K. In addition, the busbar holder 131 has the anode-side pressing parts 131s that press the anode-side busbars 132A, and the cathode-side pressing parts 131t that press the cathode-side busbars 132K, as the pressing parts 131k.

Twisting of the contact parts 132a or engaging parts 132b sometimes occurs in the busbars 132 due to the joining when the anode-side busbars 132A and the cathode-side busbars 132K are joined. Even in such cases, adopting a configuration so as to have pressing parts for each of the anode-side busbars and the cathode-side busbars as described above makes it possible to bring the busbars 132 and the electrode tabs 112 into contact in a state in which twisting of the busbars 132 is accommodated or mitigated and to join these components. These components should be joined in a state in which the connection surfaces 132f of the anode-side busbars 132A and the cathode-side busbars 132K are positioned in the same plane, but sometimes joining occurs in a state in which one set of busbars is positioned at an incline relative to the other due to variation. Even in such cases, providing the anode-side pressing parts 131s and the cathode-side pressing parts 131t makes it possible to bring the anode-side busbars 132A and the cathode-side busbars 132K into contact with individual electrode tabs 112 and to join these components.

The battery pack 100 further includes the linking parts 116-118 that link the busbar holder 131 to the first spacers 114. A state of being elastically deformed is retained in the deforming parts 131h in a state in which the busbar holder 131 is linked to the first spacers 114 by the linking parts 116-118. During joining of the busbars 132 and the electrode tabs 112 in the method for manufacturing the battery pack 100, the state in which the deforming parts 131h are elastically deformed is retained due to the busbar holder 131 being linked to the first spacers 114 by the linking parts 116-118. This makes it possible to implement a joining operation without retaining the busbar holder 131, to which the busbars 132 are attached, by means of a jig or a robot when the busbars 132 are to be joined to the electrode tabs 112.

The linking parts 116-118 include the engaging parts 114m formed on the first spacers 114, and the engaging parts 131n formed on the busbar holder 131. The linking parts 116-118 link the busbar holder 131 to the first spacers 114 due to engagement of the engaging parts 114m and the engaging parts 131n. This makes it possible to configure the engaging parts 114m and the engaging parts 131n by fitting, etc., and to link the busbar holder 131 to the first spacers 114.

In the unit cells 110, the anode-side electrode tabs 112A and the cathode-side electrode tabs 112K are arranged on one side on the outer periphery of the rectangular lamination films 113. The first spacers 114 have anode-side support surfaces 114j that support the anode-side electrode tabs 112A, and cathode-side support surfaces 114k that support the cathode-side electrode tabs 112K. The linking parts 116 are disposed at first positions between the anode-side support surfaces 114j and the cathode-side support surfaces 114k. The linking parts 117 are disposed at second positions that are positioned further outward from the linking parts 116 than are the anode-side support surfaces 114j. The linking parts 118 are disposed at third positions that are positioned further outward from the linking parts 116 than are the cathode-side support surfaces 114k. Adopting such a configuration makes it possible to stabilize a retaining force of the busbar holder 131 relative to the first spacers 114 to a greater extent than when a configuration includes linking parts 117, 118 at two locations. Accordingly, it is possible to further stabilize the pressing of the anode-side busbars 132A relative to the anode-side electrode tabs 112A and the pressing of the cathode-side busbars 132K relative to the cathode-side electrode tabs 112K.

The present invention is not limited to the embodiment described above; various changes and modifications can be made herein without departing from the scope of the claims. In the embodiment described above, a single component is formed from the brace parts 131a to the engaging parts 131n. However, the present invention is not limited to this configuration; the retaining parts 131d, the deforming parts 131h, and the pressing parts 131k can be configured as separate components from at least the brace parts 131a, the auxiliary brace parts 131b, and the horizontal wall parts 131c, and a configuration can be adopted in which these two sets of parts are integrated by fitting or bonding.

In the embodiment described above, the deforming parts 131h are used to urge the pressing parts 131k with a repulsive force in a direction in which the to-be-pressed surfaces 132e of the busbars 132 are caused to move toward the support surfaces 114h of the first spacers 114. However, the present invention is not limited to this configuration; the deforming parts 131h are not an essential portion of the configuration, and the following configuration can be adopted as the configuration for causing the to-be-pressed surfaces 132e of the busbars 132 to move. Specifically, pressing parts can be configured from fixed parts, movable parts capable of moving relative to the fixed parts, and coil springs disposed between the fixed parts and the movable parts. A configuration can be adopted in which repulsive force produced by elastic deformation of the springs presses the busbars 132 toward the electrode tabs 112.

In the embodiment described above, the shape of the busbars 132 is not corrected during attachment to the busbar holder 131 shown in FIGS. 18 and 19, but the shape is corrected during attachment of the busbar holder 131 to the first spacers 114 shown in FIGS. 19 and 20. However, the present invention is not limited to this configuration; the busbars 132 can be such that the shape of the contact parts 132a is corrected to a certain degree during attachment to the busbar holder 131 shown in FIGS. 18 and 19.

In the embodiment described above, gaps between the busbars 132 and the electrode tabs 112 are corrected from a state in which the contact parts 132a of the busbars 132 have a recessed shape relative to the electrode tabs 112, as shown in FIG. 18. However, the present invention is not limited to this configuration; in addition to the above, using the busbar holder 131 makes it possible to correct gaps between the contact parts 132a of the busbars 132 and the electrode tabs 112 even when the contact parts 132a have a projecting shape relative to the electrode tabs 112, and to sufficiently cause these components to come into contact.

In the embodiment described above, the position of the busbar unit 130 relative to the stack 110S is retained by the linking parts 116-118 during joining of the busbars 132 and the electrode tabs 112. However, the linking parts 116-118 are not essential; instead of the above, the position of the busbar unit 130 relative to the stack 110S can be retained by a jig, or the busbar unit 130 can be retained by a robot hand, etc., during joining.

The invention claimed is:

1. A battery pack comprising:
   a plurality of unit cells that define a stack of unit cells that have electrode tabs;
   a plurality of busbars that have connection portions joined to the electrode tabs;
   a support member that supports the electrode tabs; and
   a busbar holder that retains the busbars,
   the busbar holder having pressing parts that press the connection portions of the busbars toward the electrode tabs supported by the support member, and deforming parts that urge the pressing parts with a repulsive force so that the pressing parts are caused to move the busbars toward the stack of unit cells in the direction of the electrode tabs by the repulsive force,
   the deforming parts having leg parts that extend so as to project in a direction away from the busbars.

2. The battery pack according to claim 1, wherein the leg parts are formed in a U shape.

3. The battery pack according to claim 2, wherein the deforming parts are elastically deformable, the deforming parts urging the pressing parts with the repulsive force in the direction of the electrode tabs in which the pressing parts are caused to move toward the electrode tabs while the deforming parts are in an elastically deformed state.

4. The battery pack according to claim 1, wherein the pressing parts have pressing surfaces that make planar contact with the busbars.

5. The battery pack according to claim 1, wherein at least two of the unit cells are stacked, and an anode-side electrode tab of one of the unit cells and a cathode-side electrode tab of the other of the unit cells are arranged in a direction in which the unit cells are stacked;
   in the busbars, anode-side busbars connected to the anode-side electrode tab and cathode-side busbars connected to the cathode-side electrode tab are joined and integrally formed; and
   the busbar holder has anode-side pressing parts that press the anode-side busbars, and the busbar holder has cathode-side pressing parts that press the cathode-side busbars as the pressing parts.

6. The battery pack according to claim 1, further comprising
   linking parts that link the busbar holder to the support member; and
   the deforming parts being held in a state of being elastically deformed while in a state in which the busbar holder is linked to the support member by the linking parts.

7. The battery pack according to claim 6, wherein the linking parts include support-member-side engaging parts formed on the support member, and busbar-holder-side engaging parts formed on the busbar holder, the busbar holder being linked to the support member due to engagement of the support-member-side engaging parts and the busbar-holder-side engaging parts.

8. The battery pack according to claim 6, wherein
the electrode tabs of the unit cells have anode-side electrode tabs and cathode-side electrode tabs that are arranged on one side on an outer periphery;
the support member has anode-side support portions that support the anode-side electrode tabs, and cathode-side support portions that support the cathode-side electrode tabs; and
the linking parts are disposed at each of first positions between the anode-side support portions and the cathode-side support portions, second positions that are positioned further outward from the first positions than are the anode-side support portions, and third positions that are positioned further outward from first positions than are the cathode-side support portions.

9. A battery pack manufacturing method for manufacturing an battery pack, the battery pack manufacturing method comprising:
forming a stack stacking unit cells that define a stack of unit cells that have electrode tabs together with a support member that supports the electrode tabs;
retaining a plurality of busbars having connection portions to be joined to the electrode tabs with a busbar holder that is disposed so as to face the electrode tabs supported by the support member;
urging pressing parts of the busbar holder with a repulsive force so that the pressing parts are caused to move using deforming parts having leg parts that extend so as to project in a direction away from the busbars, and pressing the busbars held by the busbar holder toward the stack of unit cells in the direction of the electrode tabs by the pressing parts of the busbar holder; and
joining the busbars and the electrode tabs in a state in which the busbars and the electrode tabs are pressed toward each other.

10. The battery pack manufacturing method according to claim 9, wherein
when the busbars and the electrode tabs are joined, elastic deformation of the deforming parts of the busbar holder urges the pressing parts with the repulsive force in the widthwise direction of the electrode tabs in which the pressing parts are caused to move toward the electrode tabs.

11. The battery pack manufacturing method according to claim 10, wherein
during joining of the busbars and the electrode tabs, the state in which the deforming parts are elastically deformed is retained due to the busbar holder being linked to the support member by linking parts that link the busbar holder to the support member.

* * * * *